(12) United States Patent
Wells et al.

(10) Patent No.: US 10,895,737 B1
(45) Date of Patent: Jan. 19, 2021

(54) TRANSPARENT ELECTROACTIVE SYSTEMS AND RELATED METHODS

(71) Applicant: Facebook Technologies, LLC, Menlo Park, CA (US)

(72) Inventors: Spencer Allan Wells, Seattle, WA (US); Andrew John Ouderkirk, Redmond, WA (US); Katherine Marie Smyth, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 115 days.

(21) Appl. No.: 16/272,309

(22) Filed: Feb. 11, 2019

(51) Int. Cl.
*G02B 26/08* (2006.01)

(52) U.S. Cl.
CPC ............................. *G02B 26/0875* (2013.01)

(58) Field of Classification Search
CPC ................................................ G02B 26/0875
See application file for complete search history.

(56) References Cited

U.S. PATENT DOCUMENTS

| | | |
|---|---|---|
| 9,513,730 B2 | 12/2016 | Koo et al. |
| 2012/0194441 A1 | 8/2012 | Frey |

OTHER PUBLICATIONS

Afshinmanesh et al., "Transparent Metallic Fractal Electrodes for Semiconductor Devices", Nano Letters, 2014, 7 pages.

Eckhardt et al., "Laser microstructured metal thin films as promising alternative for indium based transparent electrodes", Optics Express A555, vol. 24, No. 6, Mar. 21, 2016, 16 pages.
Fujii et al., "Semitransparent Inverted Organic Solar Cells Using an Oxide/metal/oxide Transparent Anode", Journal of Photopolymer Science and Technology, vol. 29, No. 4, 2016, pp. 547-551.
Granstrom, Eric, "Self-Aligning Nanoparticles for Transparent Electronics", URL: http://sites.ieee.org/sfbanano/files/2015/08/Cima-Nanotech-Overview-5-10-IEEE-Nano.pdf, May 2010, 5 pages.
Groep et al., "Transparent Conducting Silver Nanowire Networks", Nano Letters, vol. 12, 2012, pp. 3188-3144.
Guo et al., "Highly stretchable and transparent nanomesh electrodes made by grain boundary lithography", Nature Communications—5:3121, Jan. 28, 2014, pp. 1-8.
Han et al., "Uniform Self-Forming Metallic Network as a High-Performance Transparent Conductive Electrode", Advanced Materials, 2013, pp. 1-5.
Hsu et al., "Performance enhancement of metal nanowire transparent conducting electrodes by mesoscale metal wires", Nature Communications—4:2522, 2013, pp. 1-7.

(Continued)

*Primary Examiner* — Wen Huang
(74) *Attorney, Agent, or Firm* — FisherBroyles, LLP

(57) ABSTRACT

The disclosed transparent electroactive systems may include at least one transparent electroactive material, a first electrode material disposed over a first surface of the transparent electroactive material, and a second electrode material disposed over a second, opposite surface of the transparent electroactive material. The first and second electrode materials may be configured to apply a sufficient voltage to the transparent electroactive material to deform the transparent electroactive material. At least the first electrode material may include conductive traces that are nonlinear. Various other methods and systems are also disclosed.

20 Claims, 16 Drawing Sheets

(56) References Cited

OTHER PUBLICATIONS

Ide et al., "A novel dot pattern generation to improvie luminance uniformity of LCD backlight", Journal of the SID, Nov. 4, 2003, pp. 659-666.

Saive et al., "Effectively Transparent Front Contacts for Optoelectronic Devices", Advanced Optical Materials, vol. 4, 2016, pp. 1470-1474.

Wu et al., "A Transparent Electrode based on a metal nanotrough network", Nature Nanotechnology, vol. 8, May 19, 2013, pp. 421-425.

Zuani et al., "High-Order Hilbert Curves: Fractal Structures with Isotropic, Tailorable Optical Properties", ACS Photonics, 2015, 6 pages.

Qi et al., "Realization of a flexible and mechanically robust Ag mesh transparent electrode and its application in a PDLC device", RSC Advances, This journal is © The Royal Society of Chemistry 2016, RSC Adv., vol. 6, 2016, pp. 13531-13536.

Lee et al., "Solution-Processed Metal Nanowire Mesh Transparent Electrodes", Nano Letters, vol. 8, No. 2, Jan. 12, 2008, pp. 689-692.

Hu et al., "Scalable Coating and Properties of Transparent, Flexible, Silver Nanowire Electrodes", vol. 4, No. 5, Apr. 28, 2010, pp. 2955-2963.

Hota et al., "Fractal Electrochemical Microsupercapacitors", Advanced Electronic Materials, vol. 3, 2017, 9 pages.

Lee et al., "Highly sensitive stretchable transparent piezoelectric nanogeneratorst", Energy Environmental Science, vol. 6, 2013, pp. 169-175.

Park et al., "Metallic Grid Electrode Fabricated via Flow Coating for High-Performance Flexible Piezoelectric Nanogenerators", The Journal of Physical Chemistry C 2015, 119, Mar. 19, 2015, pp. 7802-7808.

Chen et al., "Transparent and Stretchable High-Performance Supercapacitors Based on Wrinkled Graphene Electrodes", ACS Nano, 2014, 8 pages.

Khang et al., "A Stretchable Form of Single-Crystal Silicon for High-Performance Electronics on Rubber Substrates", Science, vol. 311, Jan. 13, 2006, pp. 208-212.

Lee et al., "Highly Stretchable Piezoelectric-Pyroelectric Hybrid Nanogenerator", Advanced Materials, vol. 26, 2014, pp. 765-769.

Jang et al., "Fabrication of Metallic Nano-mesh: Pt Nano-Mesh as a Proof of Concept for Stretchable and Transparent Electrodes", Chemistry of Materials, Aug. 7, 2013, 6 pages.

Yuan et al., "Tuning the Electrical and Optical Properties of Graphene by Ozone Treatment for Patterning Monolithic Transparent Electrodes", ACS Nano, Apr. 4, 2013, 9 pages.

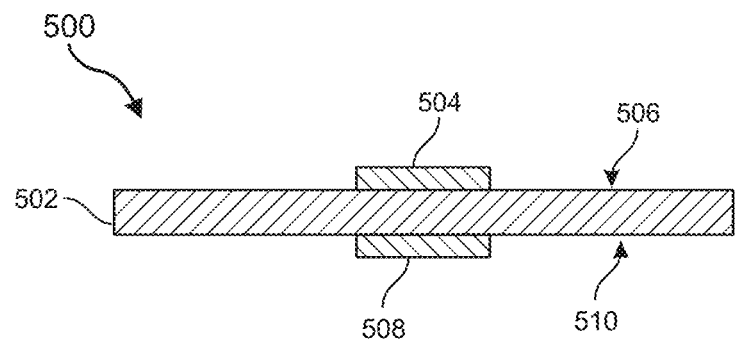
FIG. 5
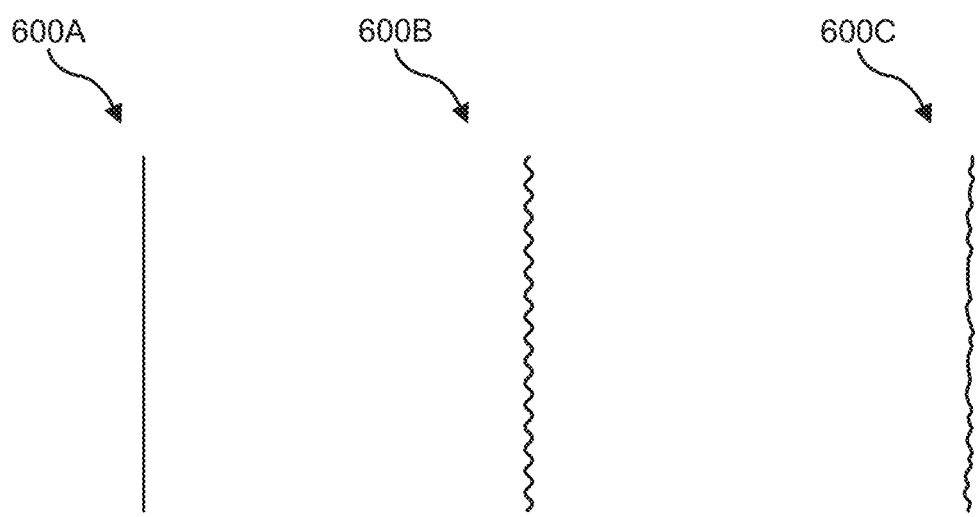
FIG. 6A  FIG. 6B  FIG. 6C

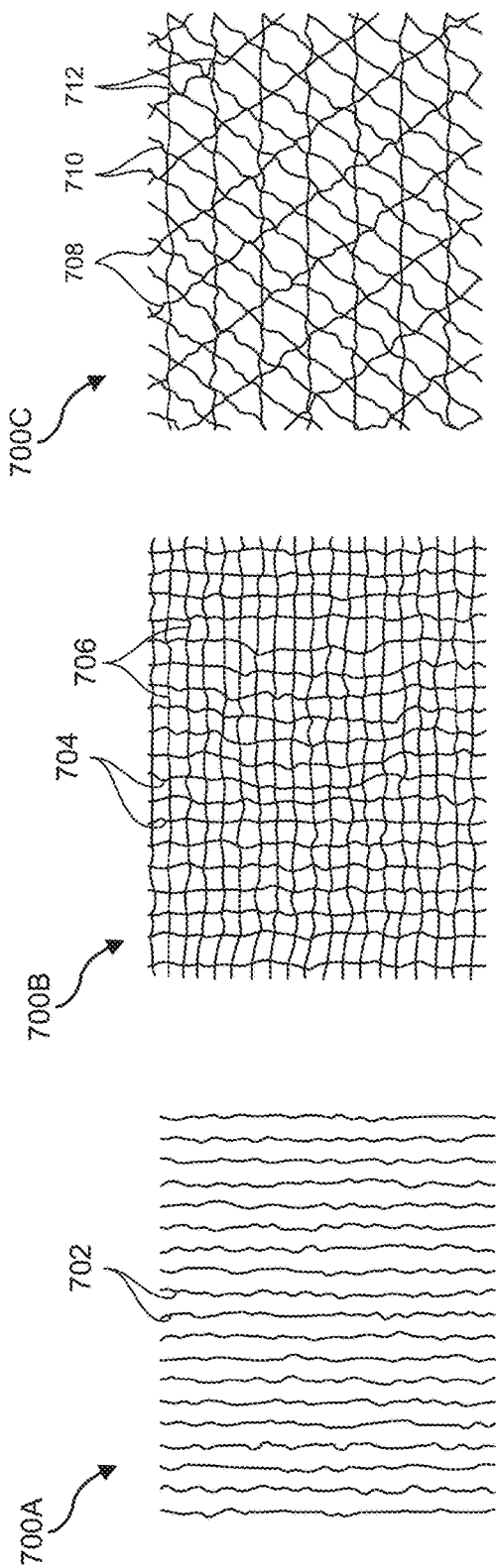
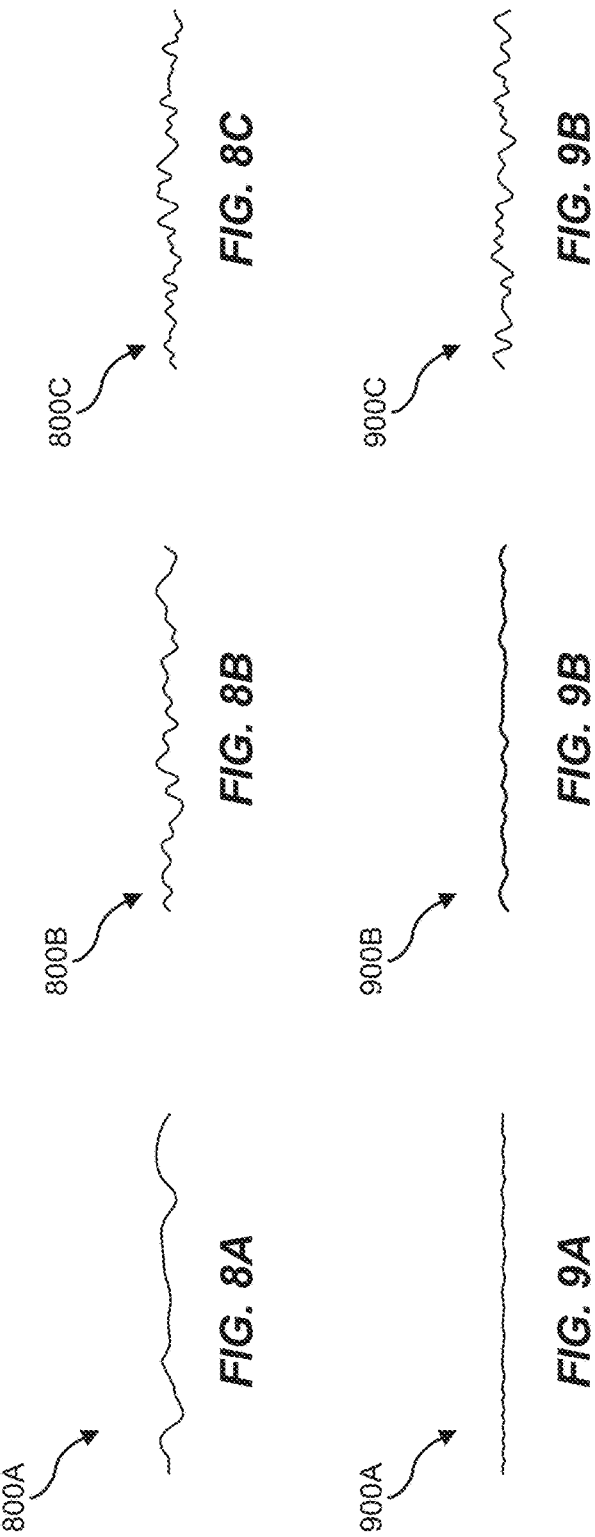

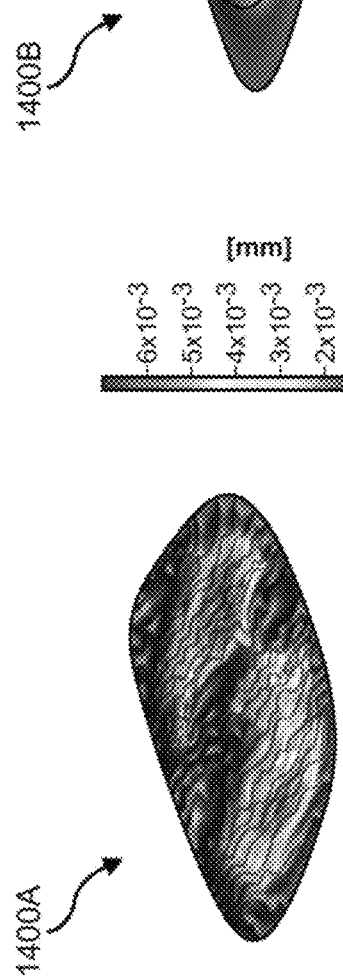
FIG. 13B
FIG. 13A
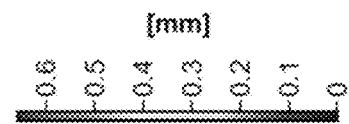
FIG. 14B
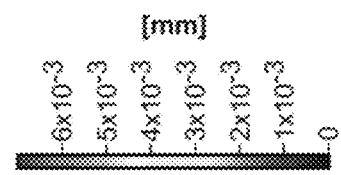
FIG. 14A

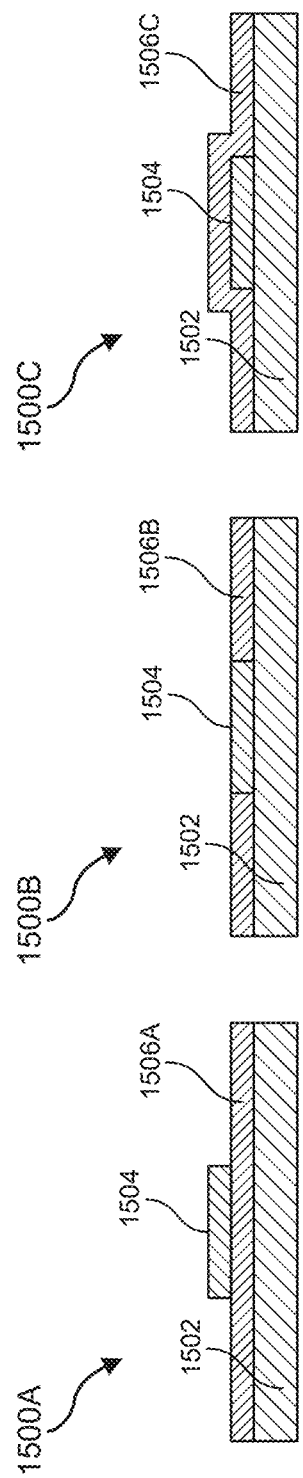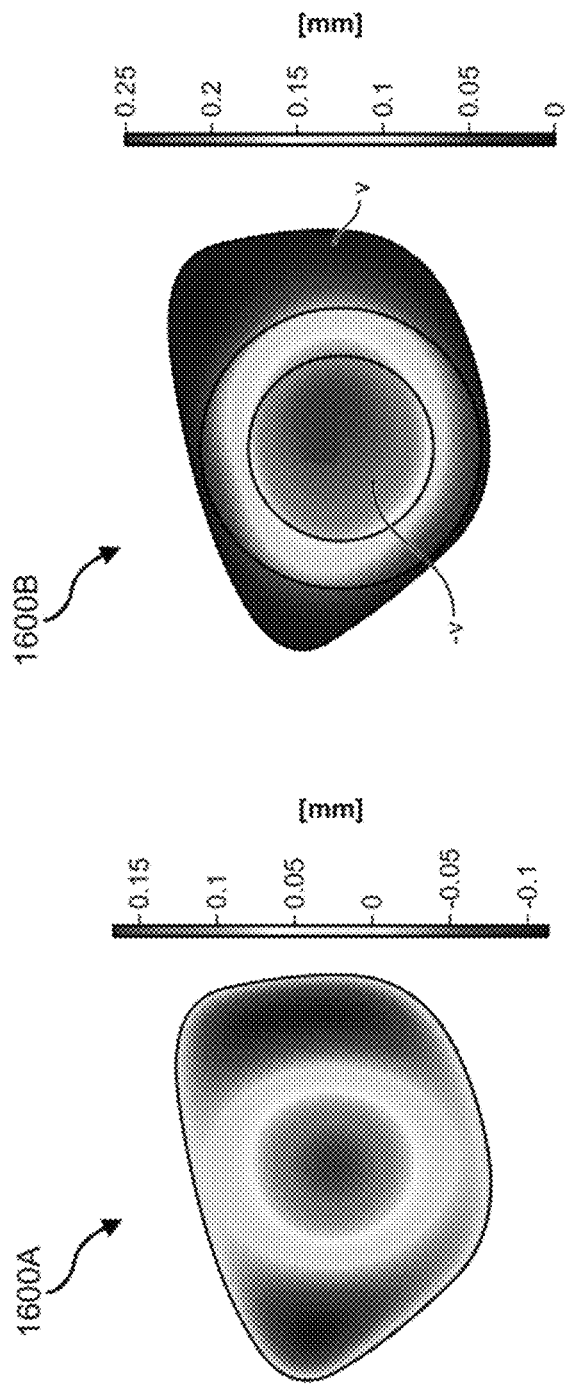

US 10,895,737 B1

TRANSPARENT ELECTROACTIVE SYSTEMS AND RELATED METHODS

BACKGROUND

Deformable optical lenses are lenses whose shape can be deformed to modify an optical property thereof, such as a focal distance. Some deformable optical lenses operate by applying an electrical voltage to an electroactive material. Additional applications, such as smart windows, transparent solar cells, electrooptic modulators, liquid crystal displays, transparent faraday cases, and transparent joule heaters, may also involve a transparent material to which a voltage is applied. In all of these applications, both conductivity of an electrode to apply the voltage and transparency of the system are design considerations that are typically in opposition to each other. In other words, materials with high electrical conductivity are generally opaque, while transparent materials usually exhibit relatively low or no electrical conductivity. For example, some metal materials are electrically conductive and opaque to visible light, while some glass and polymer materials are electrically insulative and transparent to visible light.

Some artificial-reality systems may benefit from deformable optical lenses. Artificial-reality systems include virtual reality, augmented-reality, mixed-reality, and hybrid-reality systems. Such systems may present a digital image to a user, which may overlay or replace a view of the real-world environment surrounding the user. Deformable optical lenses may be used to adjust, for example, a focus of the digital image to substantially match a focal point of the user's gaze to reduce or eliminate any perceived mismatch of images (e.g., real and/or digital) in the user's view.

Accordingly, the present disclosure identifies a need and a corresponding solution for systems having electrically conductive and optically transparent electrodes.

SUMMARY

As will be described in greater detail below, the instant disclosure describes transparent electroactive systems that include a first electrode material over a transparent electroactive material, wherein the first electrode material includes nonlinear conductive traces.

In some embodiments, the present disclosure includes transparent electroactive systems that may include at least one transparent electroactive material, a first electrode material, and a second electrode material. The transparent electroactive material may be deformable upon application of a sufficient voltage to the transparent electroactive material. The first electrode material may be disposed over a first surface of the transparent electroactive material for applying the sufficient voltage to the transparent electroactive material. The second electrode material may be disposed over a second, opposite surface of the transparent electroactive material for applying the sufficient voltage to the electroactive material. The first electrode material may include conductive traces that are nonlinear.

In some examples, a transparent voltage spreader material may be positioned adjacent to the conductive traces, wherein the first electrode material exhibits at least a first electrical conductivity and the transparent voltage spreader material exhibits a second electrical conductivity lower than the first electrical conductivity. The transparent voltage spreader material may be positioned in at least one of the following locations: laterally adjacent to the conductive traces and over the first surface of the transparent electroactive material, between the conductive traces and the first surface of the transparent electroactive material, or over the conductive traces on an opposite side thereof from the first surface of the transparent electroactive material. Average distances between adjacent conductive traces may vary in a random or pseudo-random manner.

In some examples, the second electrode includes additional conductive traces that are nonlinear. The conductive traces of the first electrode material my not overlap the additional conductive traces of the second electrode material. A third electrode material may be disposed within the transparent electroactive material between the first surface and the second surface. The third electrode material may include further conductive traces that are nonlinear. Each of the first and second electrode material may include a metallic material. The conductive traces of the first electrode material may be arranged in a lattice structure. The lattice structure may be patterned to include at least one space free of conductive traces. Each of the conductive traces of the first electrode material may have at least one of the following cross-sectional shapes: substantially rectangular, substantially circular, multiple adjacent circles, truncated elliptical, plateau with arcuate sides, or bell-curve.

In some examples, the first electrode material may include a metallic material disposed between conductive oxide materials. The conductive traces of the first electrode material may not be visible to an unaided human eye positioned up to 3 cm away and from an angle of within 60 degrees from normal to the first surface. Each of the conductive traces may have a lateral width that is less than about 100 μm, and average distances between adjacent conductive traces may each be greater than about 250 μm.

In some embodiments, transparent electroactive systems may include at least one transparent electroactive material that is deformable upon application of a sufficient voltage thereto, a first electrode material disposed over a first surface of the transparent electroactive material, a second electrode material disposed over a second, opposite surface of the transparent electroactive material, and an electrical circuit operably coupled to the first and second electrode materials and configured to control application of the sufficient voltage to the transparent electroactive material to deform the transparent electroactive material. The first electrode material may include conductive traces that are nonlinear. In some examples, a deformable, transparent, electrically passive material may be disposed adjacent to the electroactive material.

In some embodiments, the present disclosure also includes methods of fabricating a transparent electroactive system. In accordance with such methods, a first electrode material may be formed over a first surface of a transparent electroactive material that is deformable upon application of a sufficient voltage thereto. The first electrode material may include conductive traces that are nonlinear. A second electrode material may be formed over a second, opposite surface of the transparent electroactive material. The first electrode material and the second electrode material may be positioned and configured to apply the sufficient voltage to the transparent electroactive material to deform the transparent electroactive material.

In some examples, forming the first electrode material including conductive traces may include forming the first electrode material and selectively removing portions of the first electrode material to define the conductive traces. Each of forming the first electrode material and forming the second electrode material may include forming at least one of the following materials: a metallic material, a conductive nanomaterial, a graphene material, or a conductive ceramic material.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

FIG. 5 is a partial cross-sectional view of a transducer assembly of a deformable optical lens, according to at least one embodiment of the present disclosure.

FIGS. 6A-6C illustrate different types of conductive traces that may be used as electrodes in a transparent transducer (e.g., of a deformable optical lens), according to some embodiments of the present disclosure.

FIGS. 7A-7C illustrate example patterns of conductive traces that may be employed to apply a voltage to a transparent electroactive material (e.g., of a deformable optical lens), according to some embodiments of the present disclosure.

FIGS. 8A-8C illustrate nonlinear conductive traces having respectively low, medium, and high frequencies of deviations from linearity, relative to each other, according to some embodiments of the present disclosure.

FIGS. 9A-9C illustrate nonlinear conductive traces having respectively low, medium, and high amplitudes of deviations from linearity, relative to each other, according to some embodiments of the present disclosure.

FIGS. 13A and 13B are schematic cross-sectional diagrams of transducer assemblies of deformable optical lenses, illustrating a calculated distribution of voltages through electroactive materials with different electrode configurations, according to some embodiments of the present disclosure.

FIGS. 14A and 14B are schematic diagrams of transparent transducers, illustrating calculated deformation profiles resulting from the different electrode configurations of FIGS. 13A and 13B, respectively.

FIGS. 15A-15C are partial cross-sectional views of transducer assemblies (e.g., of deformable optical lenses), according to additional embodiments of the present disclosure.

FIGS. 16A and 16B are schematic diagrams of transparent transducers, illustrating calculated deformation profiles resulting from different electrode configurations, according to some embodiments of the present disclosure.

Figure 1:
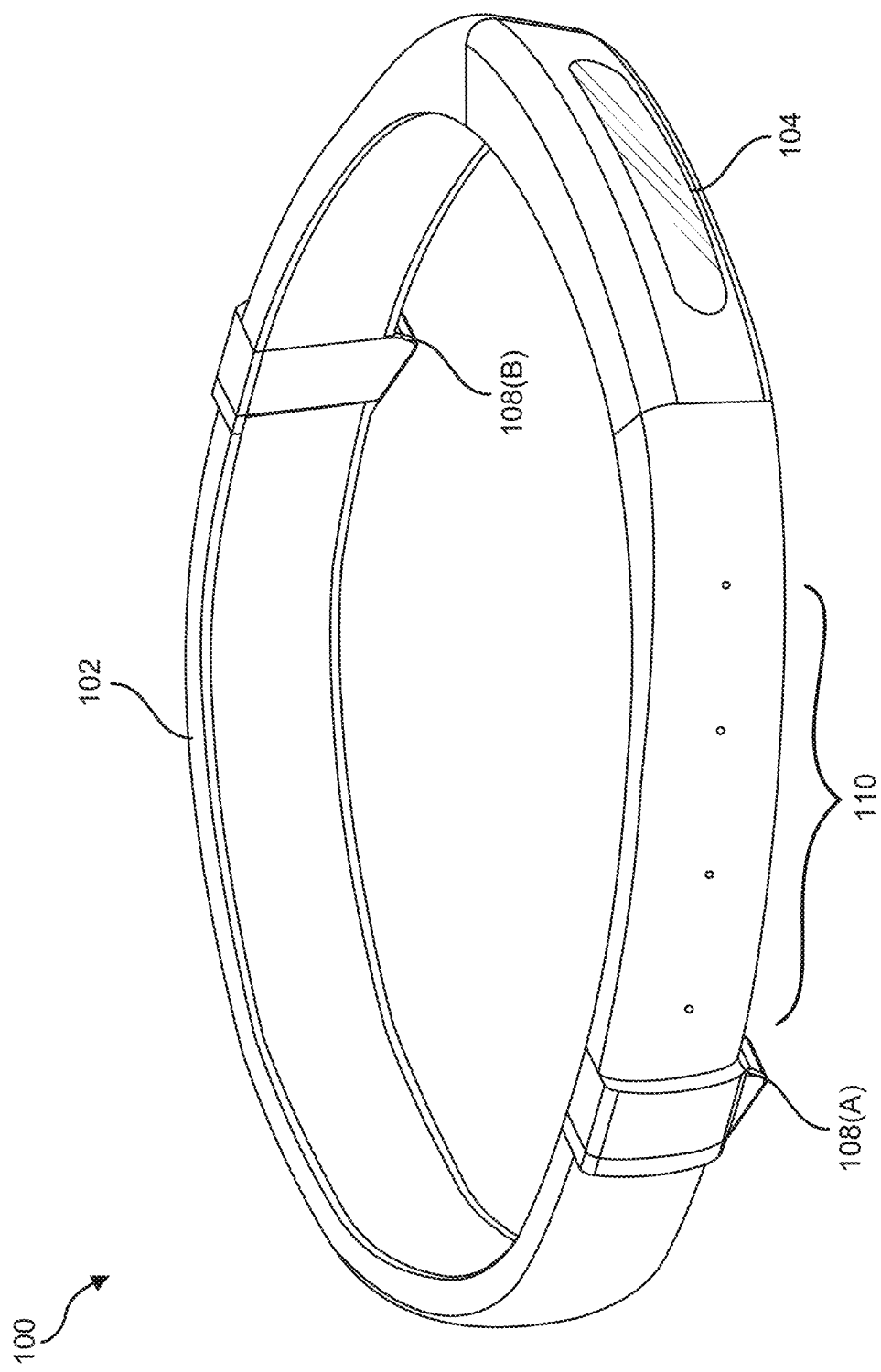
FIG. 1 is an illustration of an exemplary artificial-reality headband that may be used in connection with embodiments of this disclosure.

The drawings may use like reference numerals to identify like elements. A letter after a reference numeral, such as "10A," indicates that the text refers specifically to the element having that particular reference numeral. A reference numeral in the text without a following letter, such as "10," may refer to any or all of the elements in the drawings bearing that reference numeral (e.g., "10" in the text may refer to reference numerals "10," "10A," and/or "10B" in the drawings).

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to transparent electroactive systems that may include various configurations of nonlinear conductive traces that can be used as electrodes to apply a voltage to a transparent electroactive material. For example, the nonlinear conductive trace may be disposed within the optical aperture of a deformable optical lens. As will be explained in greater detail below, the nonlinear conductive traces may be less visible (or effectively invisible) to the user or to a third-party observer than comparable electrodes that are straight, circular, or otherwise regularly shaped. The nonlinear conductive traces can be provided at various amplitudes, frequencies, and spacings to improve voltage distribution while maintaining a low visibility thereof. The nonlinear conductive traces may be less visible than regular configurations because of irregular light diffraction patterns resulting from the nonlinear configuration, for example.

Figure 20A:
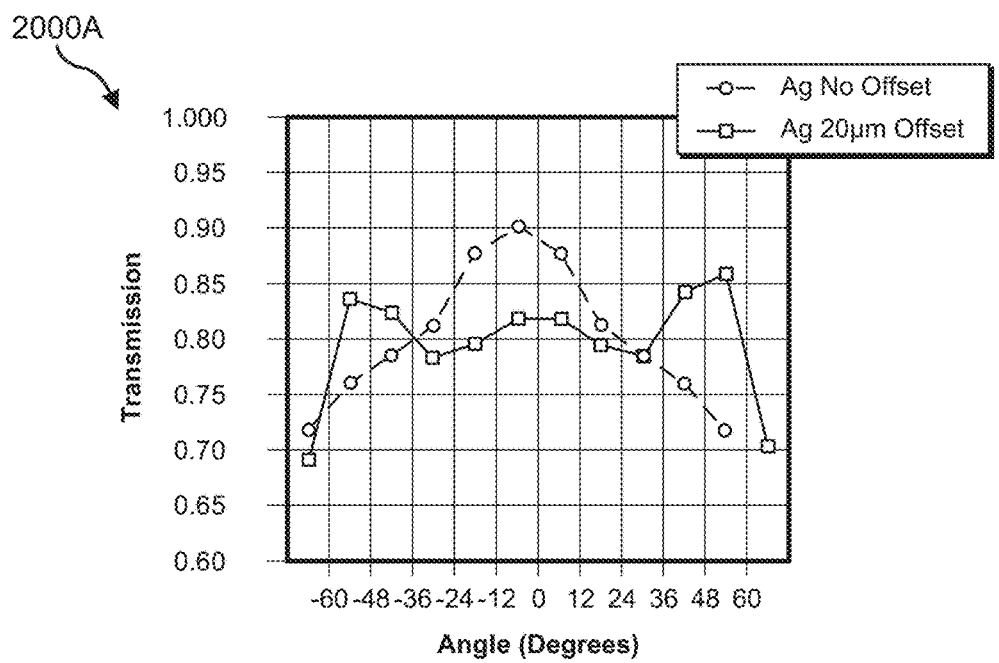
FIGS. 20A and 20B are plots showing optical transmission through transducer assemblies having different configurations of conductive traces, according to some embodiments of the present disclosure.
Figure 21:
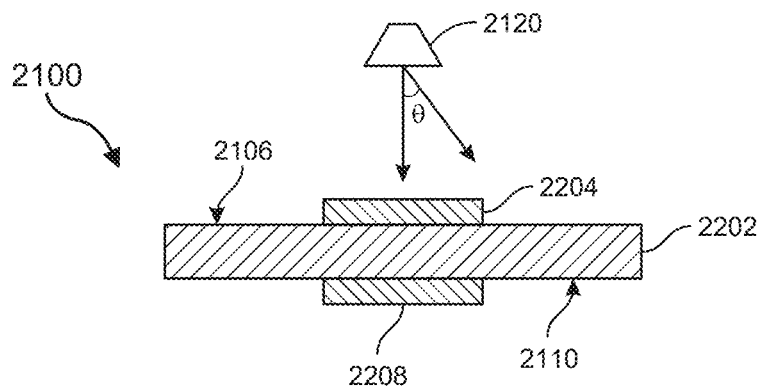
FIG. 21 is a partial cross-sectional view of a transducer assembly and an incident light source to illustrate how the incident angles of FIGS. 20A and 20B are defined, according to at least one embodiment of the present disclosure.
Figure 22A:
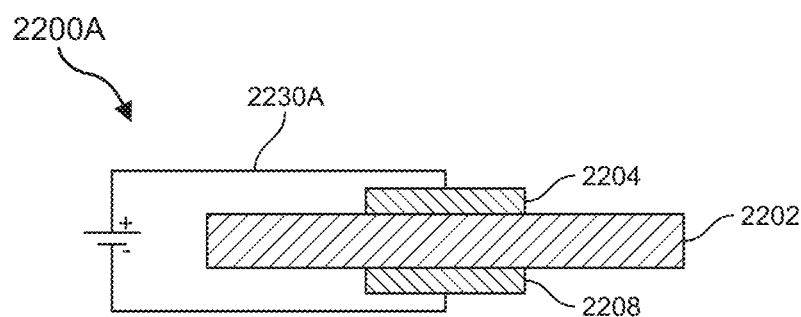
FIGS. 22A-22C are partial cross-sectional views of transducer assemblies having different configurations with respective example driving circuits for applying voltages to the transducer assemblies, according to some embodiments of the present disclosure.
Figure 22B:
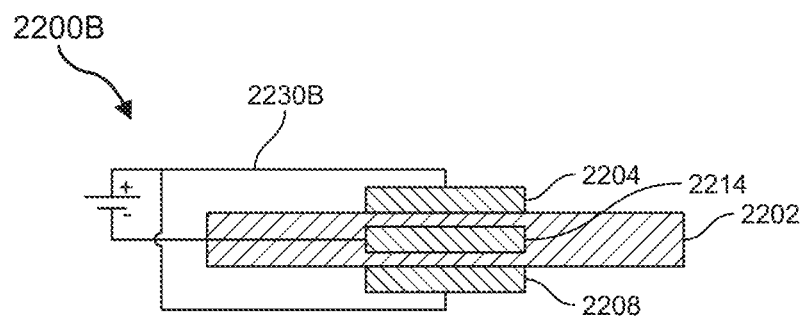
Figure 22C:
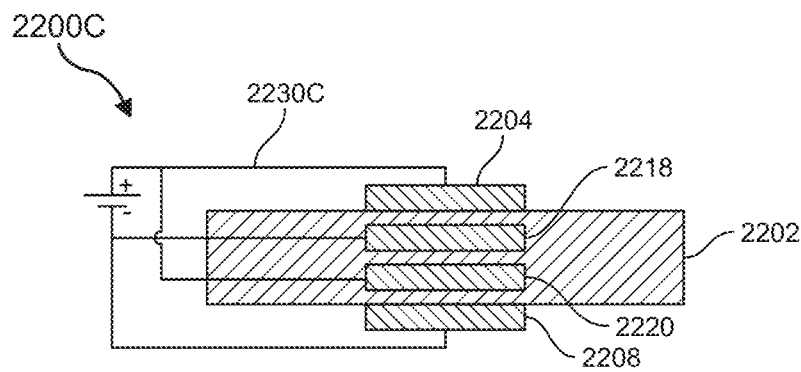
Figure 23:
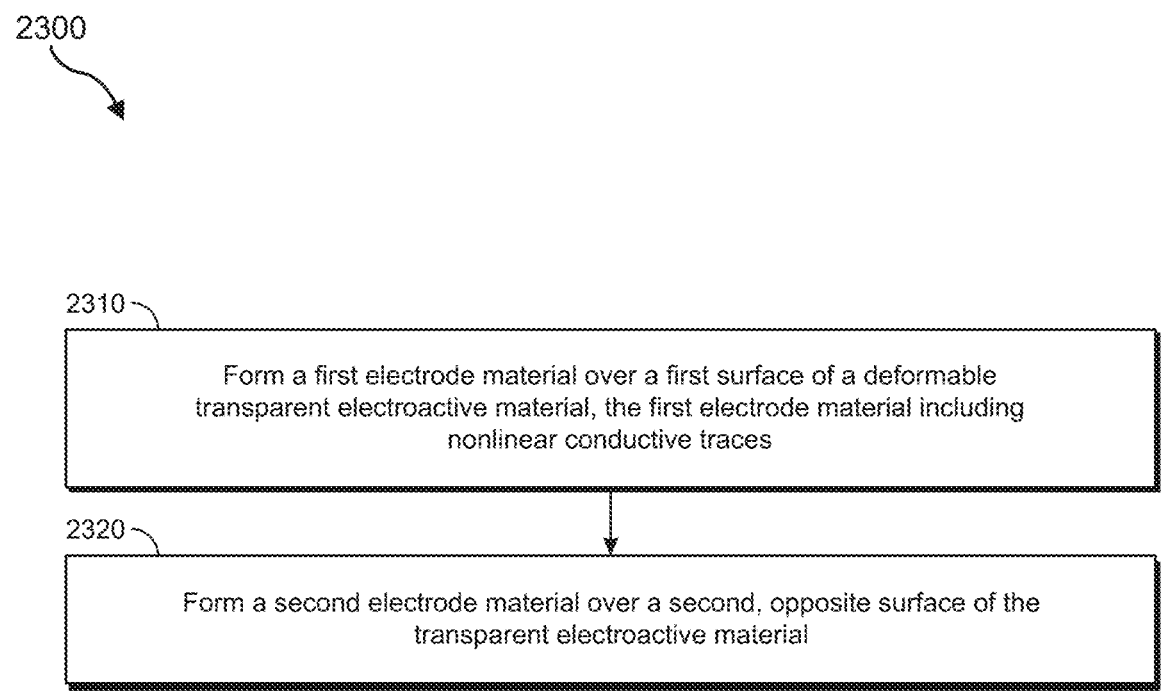
FIG. 23 is a flow diagram illustrating a method of fabricating a transparent electroactive system, according to at least one embodiment of the present disclosure.

The following will provide, with reference to FIGS. 1-4, detailed descriptions of various artificial-reality systems. With reference to FIG. 5, detailed descriptions of an example transducer assembly are provided. With reference to FIGS. 6A-12F, detailed descriptions of various example conductive traces of transducer assemblies are provided. With reference to FIGS. 13A-14B, detailed descriptions of calculated parameters of transducer assemblies are provided. With reference to FIGS. 15A-15C, detailed descriptions of additional example transducer assemblies are provided. With reference to FIGS. 16A-16B, detailed descriptions are provided of calculated deformation profiles of transducer assemblies. With reference to FIGS. 17A-19, detailed descriptions of various additional conductive trace patterns and transducer assemblies are provided. With reference to FIGS. 20A-21, detailed descriptions of calculated optical transparency are provided. With reference to FIGS. 22A-22C, detailed descriptions of various additional example transducer assemblies are provided. With reference to FIG. 23, detailed descriptions of example methods of fabricating transparent electroactive systems are provided.

Embodiments of the instant disclosure may include or be implemented in conjunction with various types of artificial-reality systems. Artificial reality is a form of reality that has been adjusted in some manner before presentation to a user, which may include, e.g., a virtual reality, an augmented reality, a mixed reality (MR), a hybrid reality, or some combination and/or derivative thereof. Artificial reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial reality systems may be implemented in a variety of different form factors and configurations. Some artificial-reality systems may be designed to work without near-eye displays (NEDs), an example of which is augmented-reality system 100 in FIG. 1. Other artificial-reality systems may include an NED that also provides visibility into the real world (e.g., augmented-reality system 200 in FIG. 2) or that visually immerses a user in an artificial reality (e.g., virtual-reality system 300 in FIG. 3). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Turning to FIG. 1, the augmented-reality system 100 generally represents a wearable device dimensioned to fit about a body part (e.g., a head) of a user. As shown in FIG. 1, the system 100 may include a frame 102 and a camera assembly 104 that is coupled to the frame 102 and configured to gather information about a local environment by observing the local environment. The augmented-reality system 100 may also include one or more audio devices, such as output audio transducers 108(A) and 108(B) and input audio transducers 110. The output audio transducers 108(A) and 108(B) may provide audio feedback and/or content to a user, and the input audio transducers 110 may capture audio in a user's environment.

As shown, the augmented-reality system 100 may not necessarily include an NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewearframes, and/or any other suitable type or form of apparatus. While the augmented-reality system 100 may not include an NED, the augmented-reality system 100 may include other types of screens or visual feedback devices (e.g., a display screen integrated into a side of the frame 102).

Figure 2:
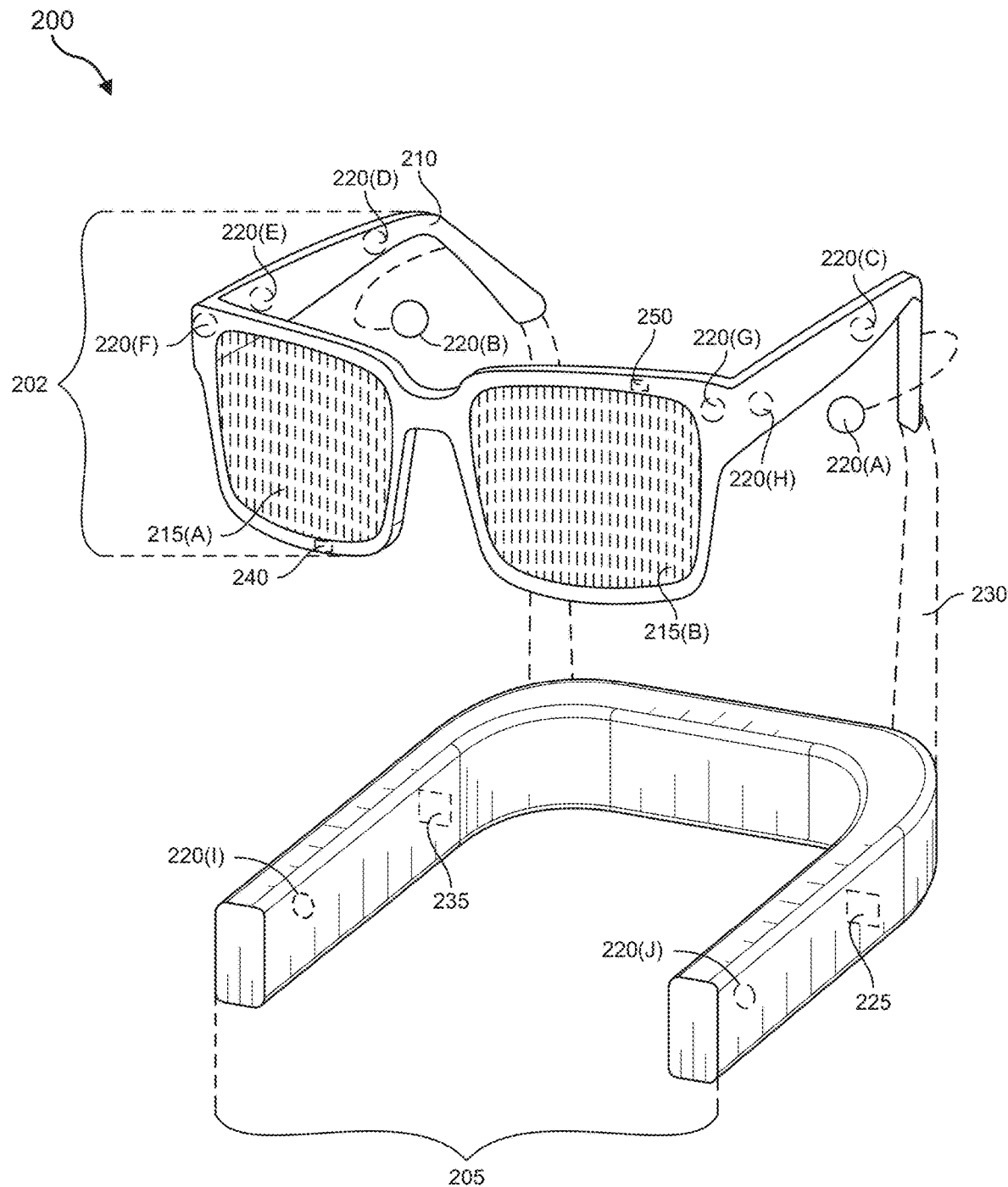
FIG. 2 is an illustration of exemplary augmented-reality glasses that may be used in connection with embodiments of this disclosure.

The embodiments discussed in this disclosure may also be implemented in augmented-reality systems that include one or more NEDs. For example, as shown in FIG. 2, the augmented-reality system 200 may include an eyewear device 202 with a frame 210 configured to hold a left display device 215(A) and a right display device 215(B) in front of a user's eyes. The display devices 215(A) and 215(B) may act together or independently to present an image or series of images to a user. While the augmented-reality system 200 includes two displays, embodiments of this disclosure may be implemented in augmented-reality systems with a single NED or more than two NEDs.

In some embodiments, the augmented-reality system 200 may include one or more sensors, such as sensor 240. The sensor 240 may generate measurement signals in response to motion of the augmented-reality system 200 and may be located on substantially any portion of the frame 210. The sensor 240 may include a position sensor, an inertial measurement unit (IMU), a depth camera assembly, or any combination thereof. In some embodiments, the augmented-reality system 200 may or may not include the sensor 240 or may include more than one sensor. In embodiments in which the sensor 240 includes an IMU, the IMU may generate calibration data based on measurement signals from the sensor 240. Examples of the sensor 240 may include, without limitation, accelerometers, gyroscopes, magnetometers, other suitable types of sensors that detect motion, sensors used for error correction of the IMU, or some combination thereof.

The augmented-reality system 200 may also include a microphone array with a plurality of acoustic sensors 220(A)-220(J), referred to collectively as acoustic sensors 220. The acoustic sensors 220 may be transducers that detect air pressure variations induced by sound waves. Each acoustic sensor 220 may be configured to detect sound and convert the detected sound into an electronic format (e.g., an analog or digital format). The microphone array in FIG. 2 may include, for example, ten acoustic sensors: 220(A) and 220(B), which may be designed to be placed inside a corresponding ear of the user, acoustic sensors 220(C), 220(D), 220(E), 220(F), 220(G), and 220(H), which may be positioned at various locations on frame 210, and/or acoustic sensors 220(I) and 220(J), which may be positioned on a corresponding neckband 205.

The configuration of the acoustic sensors 220 of the microphone array may vary. While the augmented-reality system 200 is shown in FIG. 2 as having ten acoustic sensors 220, the quantity of the acoustic sensors 220 may be greater or less than ten. In some embodiments, using higher numbers of the acoustic sensors 220 may increase the amount of audio information collected and/or the sensitivity and accuracy of the audio information. In contrast, using a lower number of the acoustic sensors 220 may decrease the computing power required by the controller 250 to process the collected audio information. In addition, the position of each acoustic sensor 220 of the microphone array may vary. For example, the position of an acoustic sensor 220 may include a defined position on the user, a defined coordinate on the frame 210, an orientation associated with each acoustic sensor, or some combination thereof.

The acoustic sensors 220(A) and 220(B) may be positioned on different parts of the user's ear, such as behind the pinna or within the auricle or fossa of the user's ear. Or, there may be additional acoustic sensors on or surrounding the ear in addition to the acoustic sensors 220 inside the ear canal. Having an acoustic sensor positioned next to an ear canal of a user may enable the microphone array to collect information on how sounds arrive at the ear canal. By positioning at least two of the acoustic sensors 220 on either side of a user's head (e.g., as binaural microphones), the augmented-reality device 200 may simulate binaural hearing and capture a three-dimensional ("3D") stereo sound field around about a user's head. In some embodiments, the acoustic sensors 220(A) and 220(B) may be connected to the augmented-reality system 200 via a wired connection, and in other embodiments, the acoustic sensors 220(A) and 220(B) may be connected to the augmented-reality system 200 via a wireless connection (e.g., a Bluetooth connection). In still other embodiments, the acoustic sensors 220(A) and 220(B) may not be used at all in conjunction with the augmented-reality system 200.

The acoustic sensors 220 on the frame 210 may be positioned along the length of the temples, across the bridge, above or below the display devices 215(A) and 215(B), or some combination thereof. The acoustic sensors 220 may be oriented such that the microphone array is able to detect sounds in a wide range of directions surrounding the user wearing the augmented-reality system 200. In some embodiments, an optimization process may be performed during manufacturing of the augmented-reality system 200 to determine relative positioning of each acoustic sensor 220 in the microphone array.

The augmented-reality system 200 may further include or be connected to an external device (e.g., a paired device), such as a neckband 205. As shown, the neckband 205 may be coupled to the eyewear device 202 via one or more connectors 230. The connectors 230 may be wired or wireless connectors and may include electrical and/or non-electrical (e.g., structural) components. In some cases, the eyewear device 202 and the neckband 205 may operate independently without any wired or wireless connection between them. While FIG. 2 illustrates the components of the eyewear device 202 and the neckband 205 in example locations on the eyewear device 202 and the neckband 205, the components may be located elsewhere and/or distributed differently on the eyewear device 202 and/or the neckband 205. In some embodiments, the components of the eyewear device 202 and the neckband 205 may be located on one or more additional peripheral devices paired with the eyewear device 202, the neckband 205, or some combination thereof. Furthermore, the neckband 205 generally represents any type or form of paired device. Thus, the following discussion of the neckband 205 may also apply to various other paired devices, such as smart watches, smart phones, wrist bands, other wearable devices, hand-held controllers, tablet computers, laptop computers, etc.

Pairing external devices, such as the neckband 205, with augmented-reality eyewear devices may enable the eyewear devices to achieve the form factor of a pair of glasses while still providing sufficient battery and computation power for expanded capabilities. Some or all of the battery power, computational resources, and/or additional features of the augmented-reality system 200 may be provided by a paired device or shared between a paired device and an eyewear device, thus reducing the weight, heat profile, and form factor of the eyewear device overall while still retaining desired functionality. For example, the neckband 205 may allow components that would otherwise be included on an eyewear device to be included in the neckband 205 since users may tolerate a heavier weight load on their shoulders than they would tolerate on their heads, nose, and/or ears. The neckband 205 may also have a larger surface area over which to diffuse and disperse heat to the ambient environment. Thus, the neckband 205 may allow for greater battery and computation capacity than might otherwise have been possible on a standalone eyewear device. Since weight carried in the neckband 205 may be less invasive to a user than weight carried in the eyewear device 202, a user may tolerate wearing a lighter eyewear device and carrying or wearing the paired device for greater lengths of time than a user would tolerate wearing a heavy standalone eyewear device, thereby enabling an artificial-reality environment to be incorporated more fully into a user's day-to-day activities.

The neckband 205 may be communicatively coupled with the eyewear device 202 and/or to other devices. The other devices may provide certain functions (e.g., tracking, localizing, depth mapping, processing, storage, etc.) to the augmented-reality system 200. In the embodiment of FIG. 2, the neckband 205 may include two acoustic sensors (e.g., 220(I) and 220(J)) that may be part of the microphone array (or potentially form their own microphone subarray). The neckband 205 may also include a controller 225 and a power source 235.

Acoustic sensors 220(I) and 220(J) of the neckband 205 may be configured to detect sound and convert the detected sound into an electronic format (analog or digital). In the embodiment of FIG. 2, the acoustic sensors 220(I) and 220(J) may be positioned on the neckband 205, thereby increasing the distance between the neckband acoustic sensors 220(I) and 220(J) and other acoustic sensors 220 positioned on the eyewear device 202. In some cases, increasing the distance between the acoustic sensors 220 of the microphone array may improve the accuracy of beamforming performed via the microphone array. For example, if a sound is detected by the acoustic sensors 220(C) and 220(D) and the distance between the acoustic sensors 220(C) and 220(D) is greater than, e.g., the distance between the acoustic sensors 220(D) and 220(E), the determined source location of the detected sound may be more accurate than if the sound had been detected by the acoustic sensors 220(D) and 220(E) positioned along a temple of the frame 210.

The controller 225 of the neckband 205 may process information generated by the sensors on the neckband 205 and/or the augmented-reality system 200. For example, the controller 225 may process information from the microphone array that describes sounds detected by the microphone array. For each detected sound, the controller 225 may perform a direction of arrival ("DoA") estimation to estimate a direction from which the detected sound arrived at the microphone array. As the microphone array detects sounds, the controller 225 may populate an audio data set with the information. In embodiments in which the augmented-reality system 200 includes an inertial measurement unit, the controller 225 may compute all inertial and spatial calculations from the IMU located on the eyewear device 202. The connector 230 may convey information between the augmented-reality system 200 and the neckband 205 and between the augmented-reality system 200 and the controller 225. The information may be in the form of optical data, electrical data, wireless data, or any other transmittable data form. Moving the processing of information generated by the augmented-reality system 200 to the neckband 205 may reduce weight and heat in the eyewear device 202, making it more comfortable to the user.

The power source 235 in the neckband 205 may provide power to the eyewear device 202 and/or to the neckband 205. The power source 235 may include, without limitation, lithium ion batteries, lithium-polymer batteries, primary lithium batteries, alkaline batteries, or any other form of power storage. In some cases, the power source 235 may be a wired power source. Including the power source 235 on the neckband 205 instead of on the eyewear device 202 may help better distribute the weight and heat generated by the power source 235.

As noted, some artificial-reality systems may, instead of blending an artificial reality with actual reality, substantially replace one or more of a user's sensory perceptions of the real world with a virtual experience. One example of this type of system is a head-worn display system, such as the virtual-reality system 300 in FIG. 3, that mostly or completely covers a user's field of view. The virtual-reality system 300 may include a front rigid body 302 and a band 304 shaped to fit around a user's head. The virtual-reality system 300 may also include output audio transducers 306(A) and 306(B). Furthermore, while not shown in FIG. 3, the front rigid body 302 may include one or more electronic elements, including one or more electronic displays, one or more inertial measurement units (IMUs), one or more tracking emitters or detectors, and/or any other suitable device or system for creating an artificial-reality experience.

Artificial reality systems may include a variety of types of visual feedback mechanisms. For example, display devices in the augmented-reality system 200 and/or the virtual-reality system 300 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial-reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial-reality systems may include one or more projection systems. For example, display devices in the augmented-reality system 200 and/or the virtual-reality system 300 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. Artificial reality systems may also be configured with any other suitable type or form of image projection system.

Artificial reality systems may also include various types of computer vision components and subsystems. For example, the augmented-reality system 100, the augmented-reality system 200, and/or the virtual-reality system 300 may include one or more optical sensors such as two-dimensional ("2D") or 3D cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 1 and 3, the output audio transducers 108(A), 108(B), 306(A), and 306(B) may include voice coil speakers, ribbon speakers, electrostatic speakers, piezoelectric speakers, bone conduction transducers, cartilage conduction transducers, and/or any other suitable type or form of audio transducer. Similarly, the input audio transducers 110 may include condenser microphones, dynamic microphones, ribbon microphones, and/or any other type or form of input transducer. In some embodiments, a single transducer may be used for both audio input and audio output.

Figure 3:
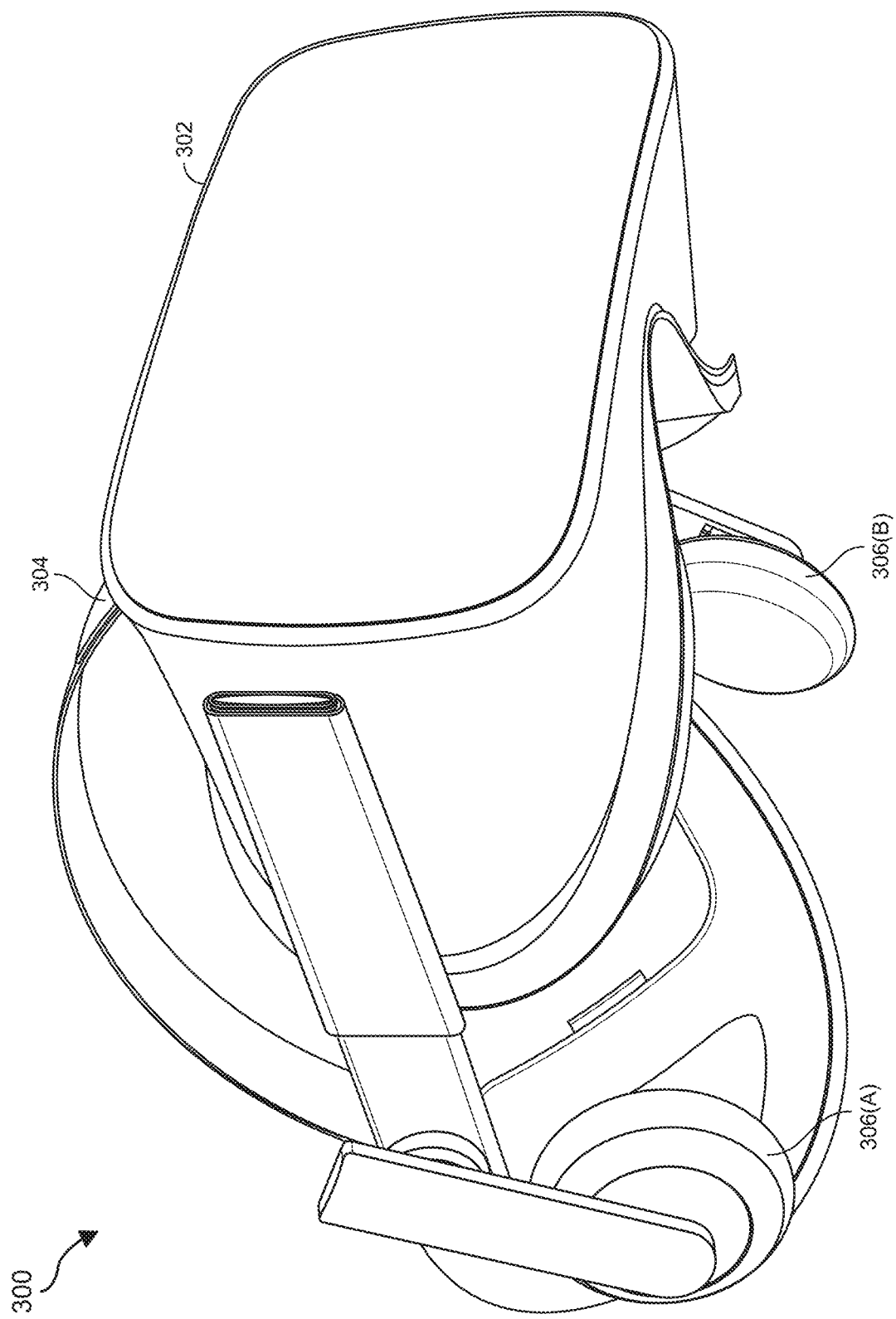
FIG. 3 is an illustration of an exemplary virtual-reality headset that may be used in connection with embodiments of this disclosure.

While not shown in FIGS. 1-3, artificial-reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial-reality experience in one or more of these contexts and environments and/or in other contexts and environments.

Figure 4:
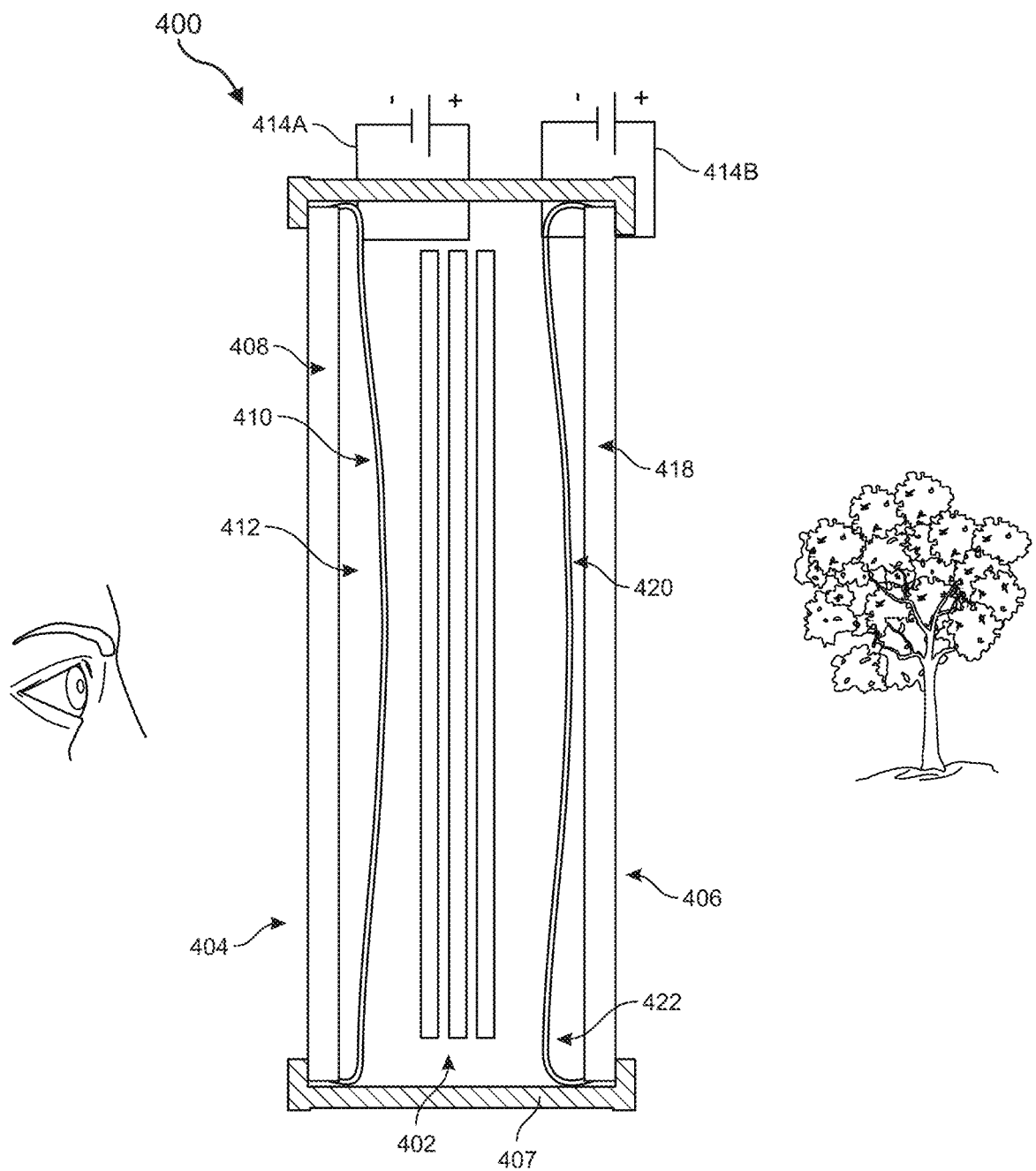
FIG. 4 is a cross-sectional view of an optical lens assembly, according to at least one embodiment of this disclosure.

An example implementation of an optical lens assembly as an accommodation and/or adaptive element in an artificial-reality HMD is shown in FIG. 4. The optical lens assemblies described herein may take a variety of shapes and forms and may include any of a variety of components. As shown in FIG. 4, an optical lens assembly 400 may include a display element 402 (e.g., an RGB waveguide), with proximal and distal deformable optical lens assemblies 404, 406 respectively positioned in front of and behind the display element 402 and mounted on a frame 407 (e.g., an eyeglass frame). The proximal optical lens assembly 404 in front of the display element 402 (i.e., for positioning near the eye) may include a proximal support structure 408, a proximal transparent transducer 410 (also referred to simply as "proximal transducer 410"), and a proximal deformable medium 412 between the proximal support structure 408 and proximal transducer 410.

In some examples, the term "transducer" may refer to an energy conversion element or device, such as an element or device that converts electrical energy into mechanical energy. In addition, the phrase "transparent" may refer to an element exhibiting greater than about 20% optical transmissivity and less than about 10% haze in the visible light spectrum. In some examples, a transparent material may exhibit greater than 80% optical transmissivity. The term "substantially" may, in reference to a given parameter, property, or condition, generally refer to a degree that one of ordinary skill in the art would understand that the given parameter, property, or condition is met with a small degree of variance, such as within acceptable manufacturing tolerances. By way of example, depending on the parameter, property, or condition that is substantially met, the parameter, property, or condition may be at least 80% met, at least 90% met, at least 95% met, at least 99% met, or fully met.

In some examples, a "deformable optical element" may refer to an element (including one or more materials or sub-elements) that is configured to be deformed to alter an optical property (e.g., an accommodative property or an adaptive optical property) of the optical lens assembly. A deformable optical element may include, for example, the proximal transducer 410 and the proximal deformable medium 412. In some examples, the term "accommodation" may refer to changing an optical power. In addition, the term "adaptive" may, in some examples, refer to tunability for providing control, compensation, and/or correction of wave front errors such as distortion and aberration(s).

As shown in FIG. 4, the distal optical lens assembly 406 may include a distal support structure 418, a distal transparent transducer 420 (also referred to simply as "distal transducer 420"), and a distal deformable medium 422. The support structures 408 and 418 may be or include a transparent material with higher relative rigidity than the transducers 410 and 420 and the deformable media 412 and 422. By way of example, each of the support structures 408 and 418 may represent or include one or more of a glass material, a sapphire material, a crystal material (e.g., quartz), a polycarbonate material, or a polymer material. The support structures 408 and 418 may provide a protective barrier for the user's eye and for the components positioned between the two support structures 408 and 418. The proximal support structure 408 may also include an eye-tracking element, which, if present, may include a selective-transmission element that transmits light having a selected property and that does not transmit light that does not have the selected property. For example, the proximal support structure 408 may include a coating or material that allows visible light to pass while reflecting non-visible light (e.g., infrared light). In this example, an infrared light source may direct infrared light to the proximal support structure 408, which may be reflected onto the user's eye. An infrared camera may then detect infrared light that is reflected from the user's eye and back to and off of the proximal support structure 408 to track the user's eye.

As shown in FIG. 4, one or both of the support structures 408 and 418 may represent a substantially planar element that does not substantially alter an image viewed through the support structures 408 and 418. In other embodiments, one or both of the support structures 408 may include or represent a corrective ophthalmic lens (e.g., a positive-optical power (i.e., magnifying) lens, a negative-optical power (i.e., diminishing) lens, a lens for correction of an aberration, etc.), or another optical lens element. Optionally, an anti-reflective coating may be applied to one or both of the support structures 408 and 418. The transducers 410 and 420 may be directly or indirectly coupled to the respective support structures 408 and 418, which may define a cavity therebetween for containing the respective deformable media 412 and 422.

The transducers described and/or illustrated herein may take any of a variety of forms and may include any number of components or materials. In one embodiment, the transducers 410 and 420 in FIG. 4 may each include at least one transparent electroactive material configured to be respectively actuated in response to an electrical voltage respectively applied by a proximal driving circuit 414A and a distal driving circuit 414B across the electroactive material. In some examples, the term "electroactive" may refer to a property of a material or composite material that deforms in response to an application of electrical energy (e.g., a voltage) and may generate electrical energy when strained or deformed. Electroactive materials, as described in some examples of this disclosure, may function as transducers or as a component of transducers. As will be discussed further in this disclosure below, the transducers 410 and 420 may also include electrode materials that are operatively coupled to the electroactive material(s), for coupling the proximal driving circuit 414A to the electroactive material(s) of the proximal transducer 410. The electrode materials may be disposed on a portion of major surfaces of the electroactive material(s) or may be disposed across substantially an entirety of the major surfaces of the electroactive material(s).

In some examples, the electrode materials may be or include a substantially continuous, transparent, electrically conductive material. Additionally or alternatively, the electrode materials may be or include conductive traces (e.g., wires) disposed on the transducers 410, 420, such as non-intersecting (e.g., evenly spaced, non-evenly spaced, skew, etc.) conductive wires or intersecting (e.g., a crosshatch pattern, a grid pattern, a lattice pattern, etc.) conductive wires, some examples of which are described below. In some examples, at least portions of the conductive traces may be nonlinear.

In embodiments including intersecting conductive traces, addressable nodes may be included at intersections of the conductive traces, which may be capable of application of varying voltages at the addressable nodes (e.g., a first applied voltage at a first addressable node and a second applied voltage at a second addressable node). For example, the optical lens assembly 400 may be capable of deformation and operation in a bifocal mode by applying different voltages at different addressable nodes, or to correct for optical aberrations or distortions. In additional embodiments, the electrode materials may be arranged to have conductive branching, with a subset of conductive branches that may intersect a conductive trace and other conductive branches that may intersect with the subset of conductive branches. The conductive branching, if present, may provide for the application of a voltage across a wider area compared to embodiments with conductive traces but lacking such conductive branching.

In some examples, relational terms, such as "first," "second," "over," "top," "bottom," "underlying," "vertical," "horizontal," etc., may be used for clarity and convenience in understanding the disclosure and accompanying drawings and does not connote or depend on any specific preference, orientation, or order, except where the context clearly indicates otherwise. In some examples, "conductive" may refer to an ability of a material or structure to conduct electricity with a sheet resistance of less than about $10^6$ ohms/square. In some examples, the term "nonlinear" may include deviating from a linear trend, such as such as having periodic, random, or pseudo-random deviations from linearity. Periodic deviations from linearity may include deviations (e.g., jogs, chicanes, curves, etc.) with regular, repeating shapes. Random deviations from linearity may have no perceived consistent repetitions or patterns and may be generated utilizing a random number generator (RNG) to determine an amplitude and frequency of any given deviation, for example. Pseudo-random deviations from linearity may appear to be random but may actually be generated by a deterministic causal process.

Electroactive materials suitable for the transducers 410 and 420 may be or include, for example: piezoelectric and electrostrictive polymers, ceramics, and minerals; dielectric elastomers; ferroelectric materials; ionic polymer conductors; etc. By way of example and not limitation, elastic piezoelectric polymers may be employed, such as bi-axial polyvinylidene fluoride ("PVDF") or co-polymer poly(vinylidene fluoride-co-trifluoroethylene) ("PVDF-TrFE"). Single crystal materials that may be suitable for the transducers 410 and 420 include, for example, $K_{0.5}Na_{0.5}NbO_3$ ("KNN"), barium titanate, lithium niobate, lithium tetraborate, quartz, $Pb(Mg_{1/3}Nb_{2/3})_3$—$PbTiO_3$ ("PMN-PT"), $Pb(Zn_{1/3}Nb_{2/3})O_3$—$PbTiO_3$ ("PZN-PT"), etc. In additional examples, the material of the transducers 410 and 420 may be a polycrystalline material. The material of the transducers 410 and 420 may have a perovskite-type crystallography.

In some examples, the electroactive material of the transducers 410 and 420 may include a ceramic material (e.g., a polycrystalline ceramic material), such as a hot-pressed (e.g., pressed at high pressure and hot isostatic pressure), vacuum sintered, spark plasma sintered, and/or microwave sintered ceramic material. In such examples, a precursor powder material may be pressed and/or heated to form the electroactive material of the transducers 410 and 420. Powder may be formed by various methods, such as by grinding the material, abrading the material, chemical co-precipitation, and/or sol-gel and gel combustion. In some embodiments, a green body may initially be formed prior to hot-pressing and/or sintering, such as by tape casting, slip casting, or gel casting a powdered ceramic material.

For example, hot-pressed lead zirconate titanate ("PZT") may be used for the transducers 410 and 420. In this example, the hot-pressing process may increase a density of the PZT (relative to conventional processes), which may in turn increase the transmissivity and optical transparency of the electroactive material (since, e.g., increased densities may lower the effects of scattering, which may negatively impact transmissivity).

In some embodiments, the density of the hot-pressed PZT (or other materials formed from a powdered precursor) may be further increased by including a dopant, such as niobium (Nb), lanthanum (La), barium (Ba), etc. In these embodiments, this increase in density may further increase the transmissivity and optical transparency of the electroactive material. Additional examples of hot-pressed polycrystalline ceramic materials (which may or may not include a dopant for further increasing the density) may include KNN, barium titanate, lead zirconate titanate ("PZT"), PMN-PT, and/or PZN-PT. Such materials may be fabricated by hot-pressing (e.g., applying heat and pressure to) a powdered ceramic material or powdered ceramic compact, which may optionally include a dopant (e.g., a powdered dopant), as described above. In some embodiments, the resulting material may be polished.

Actuation of the transducers 410 and 420 by the driving circuits 414A and 414B may result in deformation of the deformable optical elements, and thereby adjustment of an optical property of the optical lens assemblies 404 and 406. For example, deformation of the proximal transducer 410 by the proximal driving circuit 414B may result in adjusting the focus of a virtual image displayed by the display element 402 and/or of a real-world view from the perspective of the user's eye. In this example, the distal deformable lens assembly 406 behind the display element 402 may be simultaneously and conversely actuated (e.g., into a concave state when the proximal transducer 410 is actuated into a convex state, into a convex state when the proximal transducer 410 is actuated into a concave state, etc.) by the distal driving circuit 414B to result in a zero-optical power view of the real world. In other examples, the proximal and distal deformable lens assemblies may be independently or separately actuated. Voltage polarity changes may alternate deformation of the transducers 410 and 420 between convex and concave states. Upon actuation, at least a portion of the deformable media 412 and 422 may deform and/or flow to conform to a shape of the respective transducers 410 and 420. In some embodiments, actuation by the transducers 410 and 420 may be augmented by one or more electromechanical elements, such as a rotational or linear transducer.

The deformable media described and/or illustrated herein may take any of a variety of forms and may include any number of components or materials. In the example illustrated in FIG. 4, the deformable media 412 and 422 may represent or include a transparent material with mechanical properties that allow for deformation upon actuation, as described above. The deformable media 412 and 422 may be or include a deformable, transparent, electrically passive material. By way of example and not limitation, the deformable media 412 and 422 may represent or include a gas (e.g., air, nitrogen, etc.), a liquid (e.g., water, saline solution, a high-refractive index liquid, etc.), a polymer material, a gel (e.g., a silicone gel), a foam (e.g., a silica aerogel), etc.

In some examples (e.g., for augmented-reality applications), the display element 402 may also be transparent. Due to the substantial transparency of the display element 402, support structures 408 and 418, deformable media 412 and 422, and transducers 410 and 420, an optical aperture of the optical lens assembly 400 (including respective optical apertures of the optical lens assemblies 404 and 406) may be transparent. Thus, in some examples, the optical lens assembly 400 may be characterized as including a deformable element including at least a portion of a transparent transducer (e.g., one or both of the transducers 410 and 420) that is positioned within a transparent optical aperture of the optical lens assembly 400, or of the optical lens assemblies 404 and/or 406. The term "optical aperture" may, in some examples, refer to a portion of an optical lens assembly or head-mounted display through which a user may view a virtual image and/or a real-world environment. Elements that are positioned within, or viewable through, the optical aperture may be referred to as "in-aperture" elements.

As briefly noted above, although the proximal and distal support structures 408, 418 of FIG. 4 are illustrated as substantially planar, the present disclosure is not so limited. In additional embodiments, one or both of the proximal or distal support structures 408, 418 may be or include a corrective ophthalmic lens, or a curved zero-optical power lens (e.g., a zero-power meniscus lens). A shape of the proximal and/or distal support structures 408, 418 may, in some embodiments, be tailored to or selected in consideration of a specific user to correct vision impairments or to otherwise meet user preferences. In some examples, the outside facing and eye side support structures 408, 418 in FIG. 4 can be zero-power meniscus lens elements for improved anti-reflective properties and easier integration with potentially non-flat optical eye-tracking and/or ophthalmic optical elements at the proximal support structure 408.

Two optical lens assemblies 400 may be integrated into a single frame 407 such as an eyeglasses frame (FIG. 2). Each of the optical lens assemblies 400 may be tailored to or selected in consideration of a particular user's eye. In addition to supporting the optical lens assemblies 400, the frame 407 may also support other elements, such as the driving circuits 414A, 414B, a power supply element (e.g., a battery), a communication component (e.g., a component for communication via WIFI, BLUETOOTH, near-field communications ("NFC"), or a wired connection, etc.), a graphics processing unit for rendering an image on the display element(s), an image sensor, audio components, etc. In some embodiments, such as for incorporation in a virtual-reality system (FIG. 3), the proximal optical lens assembly 404 may be used without a corresponding distal lens assembly 414.

Although some of the drawings are illustrated and described herein with reference to optical systems, such as artificial-reality systems and eyeglass systems, the present disclosure is not so limited. Rather, embodiments of the present disclosure are applicable to any transparent electroactive system that may benefit from conductive traces having a lower visibility than conventional conductive traces. For example, embodiments of the present disclosure may be applicable mechanisms for switching liquid crystals for active global display dimming, smart windows, transparent solar cells, electrooptic modulators, transparent faraday cages, and transparent joule heaters (e.g., for window or lens defogging). Indeed, any mechanism or system that involves the application of an electric field to a transparent insulator may benefit from embodiments of the present disclosure.

FIG. 5 is a partial cross-sectional view of a transducer assembly 500 of a deformable optical lens. For example, the transducer assembly 500 may be used for the proximal transducer 410 and/or for the distal transducer 420 in the optical lens assembly 400 of FIG. 4. Referring to FIG. 5, the transducer assembly 500 may include an electroactive material 502 with a first electrode material 504 disposed over a first (e.g., upper) surface 506 and a second electrode material 508 disposed over a second, opposite (e.g., lower) surface 510. In this example, the first electrode material 504 and/or the second electrode material 508 may be nonlinear to reduce visibility thereof to a human eye looking through the transducer assembly 500.

The first electrode material 504 and the second electrode material 508 may exhibit an electrical conductivity sufficient to apply a voltage to the electroactive material 502 to deform the electroactive material 502. By way of example and not limitation, the electrode materials 504, 508 may be or include at least one metallic material, (such as gold, silver, titanium, copper, etc.), a conductive ceramic material, carbon nanotubes, nanowires, single- or multi-layer graphene, etc. The electrode materials 504, 508 themselves may not be transparent, in some examples. However, providing the electrode materials 504, 508 in the configurations (e.g., the shapes, sizes, nonlinear arrangements, etc.) described herein may make them at least substantially imperceptible to a user of deformable optical lenses including the transducer assembly 500 in the optical aperture thereof. Applying a sufficient voltage to the electrode materials 504, 508 may deform the electroactive material 502 to alter at least one optical property (e.g., a focus, an optical aberration correction, an accommodative property, an adaptive property, etc.) of the deformable optical lens incorporating the transducer assembly 500.

FIGS. 6A-6C illustrate different types of conductive traces that may be used as electrodes in a transparent transducer of deformable optical lens. For example, one or more of the conductive traces of FIGS. 6A-6C may be used as the first or second conductive trace 504, 508 of FIG. 5.

In particular, FIG. 6A shows a linear conductive trace 600A, FIG. 6B shows a nonlinear conductive trace 600B with periodic deviations from linearity (also referred to as "periodic conductive trace 600B"), and FIG. 6C shows a nonlinear conductive trace 600C with random or pseudo-random deviations from linearity (also referred to as "random conductive trace 600C").

Generally, assuming the conductive traces 600 are made from an opaque material (e.g., a metal material) and have a same line width as each other, the linear conductive trace 600A may be most visibly perceptible, the periodic conductive trace 600B may be visibly perceptible to an intermediate degree, and the random conductive trace 600C may be least visibly perceptible to the human eye. The differences in visible perceptibility of the conductive traces 600 may occur due to the manner in which light scatters around edges of the conductive traces 600. In addition, neurological effects may cause straight or other regularly shaped lines to be more visibly perceptible than nonlinear (e.g., periodic, random, or pseudo-random) lines. Accordingly, in some embodiments at least portions of electrodes may be nonlinear to reduce or effectively eliminate a visible perceptibility thereof to a user. For example, at least portions of electrodes that are positioned within an optical aperture of a deformable optical lens may be nonlinear. Various examples of systems and deformable optical lenses that utilize nonlinear conductive traces in electrodes are described herein.

FIGS. 7A-7C illustrate some example patterns 700 of conductive traces that may be employed to apply a voltage to a transparent electroactive material (e.g., an in-aperture transducer) of a deformable optical lens.

In FIG. 7A, a pattern 700A of conductive traces 702 is shown. The conductive traces 702 may be nonlinear (e.g., having periodic, random, or pseudo-random deviations from linearity), but may have a trend extending in a generally linear direction (e.g., bottom to top, in the view of FIG. 7A). The conductive traces 702 of the pattern 700A may not intersect with each other and may be substantially equally spaced from each other. In other words, an average lateral distance between multiple different sets of adjacent conductive traces 702 of the pattern 700A may be substantially equal. In some embodiments, the conductive traces 702 may be connected to a common electrical source at ends thereof for applying a voltage across an area the electroactive material. The pattern 700A of nonlinear conductive traces 702 may be less visibly perceptible to the human eye compared to a similar pattern of linear conductive traces.

In FIG. 7B, a pattern 700B of vertical conductive traces 704 and horizontal conductive traces 706, arranged in a lattice structure, is shown. Each of the vertical conductive traces 704 and horizontal conductive traces 706 may be nonlinear (e.g., having periodic, random, or pseudo-random deviations from linearity), but may have a trend extending in a generally linear direction (e.g., bottom to top for the vertical conductive traces 704 and left to right for the horizontal conductive traces 706, in the view of FIG. 7B). The vertical conductive traces 704 of the pattern 700B may be substantially equally spaced from each other, and the horizontal conductive traces 706 may be substantially equally spaced from each other. The vertical conductive traces 704 may intersect with the horizontal conductive traces 706. In some examples, the pattern 700B shown in FIG. 7B may be capable of more evenly distributing a voltage over the area of a corresponding electroactive material but may be somewhat more visibly perceptible to the human eye relative to the pattern 700A shown in FIG. 7A.

In FIG. 7C, a pattern 700B of downward sloping conductive traces 708, upward sloping conductive traces 710, and horizontal conductive traces 712, arranged in a lattice structure, is shown. Each of the conductive traces 708, 710, and 712 may be nonlinear (e.g., having periodic, random, or pseudo-random deviations from linearity), but may have a trend extending in a generally linear direction (e.g., upper left to lower right for the downward sloping conductive traces 708, lower left to upper right for the upward sloping conductive traces 710, and left to right for the horizontal conductive traces 712, in the view of FIG. 7C). The conductive traces 708, 710, and 712 may intersect with each other. The downward sloping conductive traces 708 may be substantially equally spaced from each other, the upward sloping conductive traces 710 may be substantially equally spaced from each other, and the horizontal conductive traces 712 may be substantially equally spaced from each other. In some examples, the pattern 700C of FIG. 7C may be capable of more evenly distributing a voltage over the area of a corresponding electroactive material but may be somewhat more visibly perceptible to the human eye relative to either of the patterns 700A and 700B shown in FIGS. 7A and 7B, respectively.

Accordingly, different patterns 700A, 700B, 700C of conductive traces can be selected for use in different deformable lenses, depending on a balance of design parameters (e.g., electrical needs, low visibility needs, fabrication cost, etc.) for a given application.

FIGS. 8A-8C illustrate nonlinear conductive traces 800 having respectively low, medium, and high frequencies of deviations from linearity, relative to each other. In particular, FIG. 8A illustrates a nonlinear conductive trace 800A that has a low frequency of deviations from linearity, FIG. 8B illustrates a nonlinear conductive trace 800B that has a medium frequency of deviations from linearity, and FIG. 8C illustrates a nonlinear conductive trace 800C that has a high frequency of deviations from linearity. In some examples, increasing the frequency of deviations from linearity may decrease a visibility of the conductive trace 800, but a corresponding electrical resistance and current drop may increase due to the increased length of the conductive trace 800.

Accordingly, conductive traces having different frequencies of deviations from linearity can be selected for different deformable lenses, depending on a balance of design parameters (e.g., electrical needs, low visibility needs, fabrication cost, etc.) for a given application.

FIGS. 9A-9C illustrate nonlinear conductive traces 900 having respectively low, medium, and high amplitudes of deviations from linearity, relative to each other. In particular, FIG. 9A illustrates a nonlinear conductive trace 900A that has a low amplitude of deviations from linearity, FIG. 9B illustrates a nonlinear conductive trace 900B that has a medium amplitude of deviations from linearity, and FIG. 9C illustrates a nonlinear conductive trace 900C that has a high amplitude of deviations from linearity. In some examples, increasing the amplitude of deviations from linearity may decrease a visibility of the conductive trace 900, but a corresponding electrical resistance and current drop may increase due to the increased length of the conductive trace 900.

Accordingly, conductive traces having different amplitudes of deviations from linearity can be selected for different deformable lenses, depending on a balance of design parameters (e.g., electrical needs, low visibility needs, fabrication cost, etc.) for a given application.

Figure 10A:
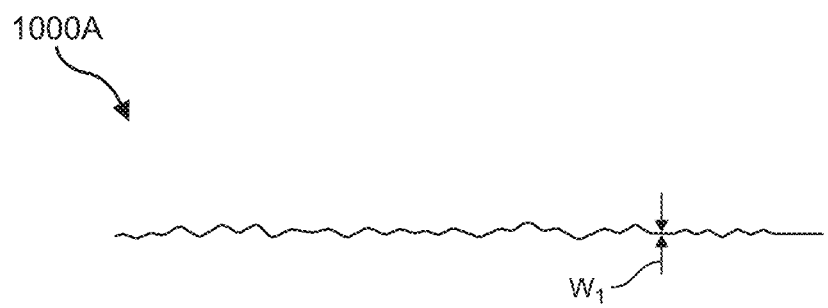
FIGS. 10A-10C illustrate nonlinear conductive traces having respectively low, medium, and high line widths, relative to each other, according to some embodiments of the present disclosure.
Figure 10B:
Figure 10C:
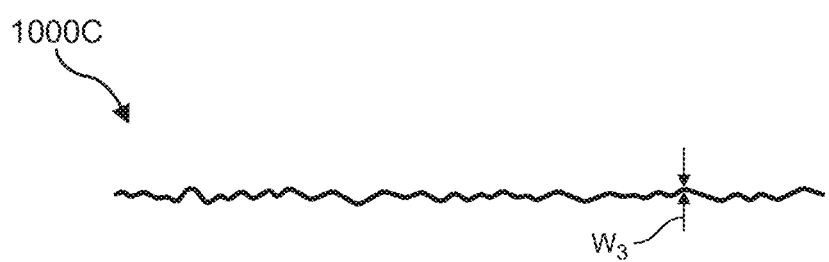

FIGS. 10A-10C illustrate nonlinear conductive 1000 having respectively low, medium, and high line widths, relative to each other. In particular, FIG. 10A illustrates a nonlinear conductive trace 1000A having a low line width $W_1$, FIG. 10B illustrates a nonlinear conductive trace 1000B having a medium line width $W_2$, and FIG. 10C illustrates a nonlinear conductive trace 1000C having a high line width $W_3$. In some examples, increasing the line width of the conductive trace 1000 may increase a visibility of the conductive trace 1000, but a corresponding electrical resistance and current drop may decrease due to the increased width of the conductive trace 1000.

Accordingly, conductive traces having different line widths may be selected for different deformable lenses, depending on a balance of design parameters (e.g., electrical needs, low visibility needs, fabrication cost, etc.) for a given application.

Figure 11B:
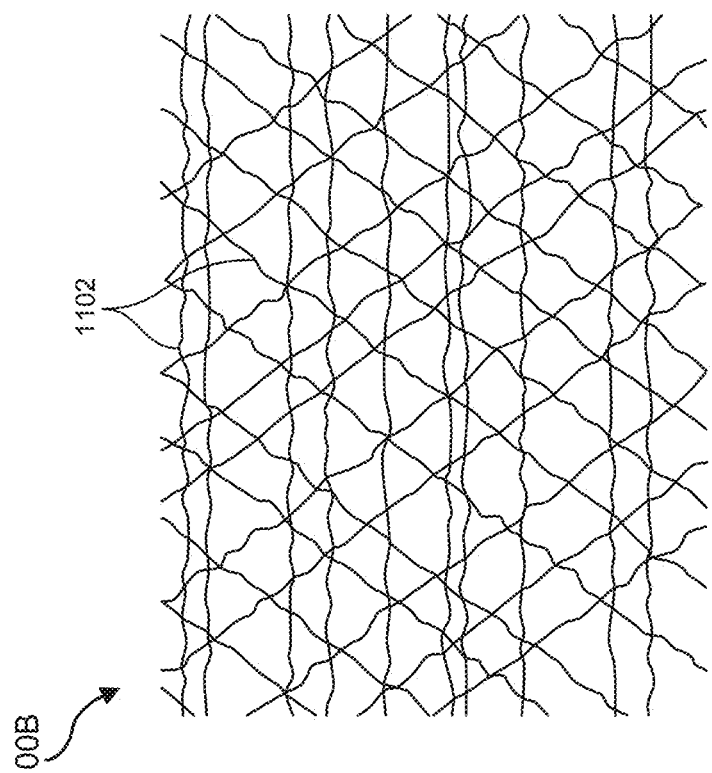
FIGS. 11A and 11B illustrate example patterns of conductive traces with variable distances between adjacent conductive traces therein, according to some embodiments of the present disclosure.
Figure 11A:
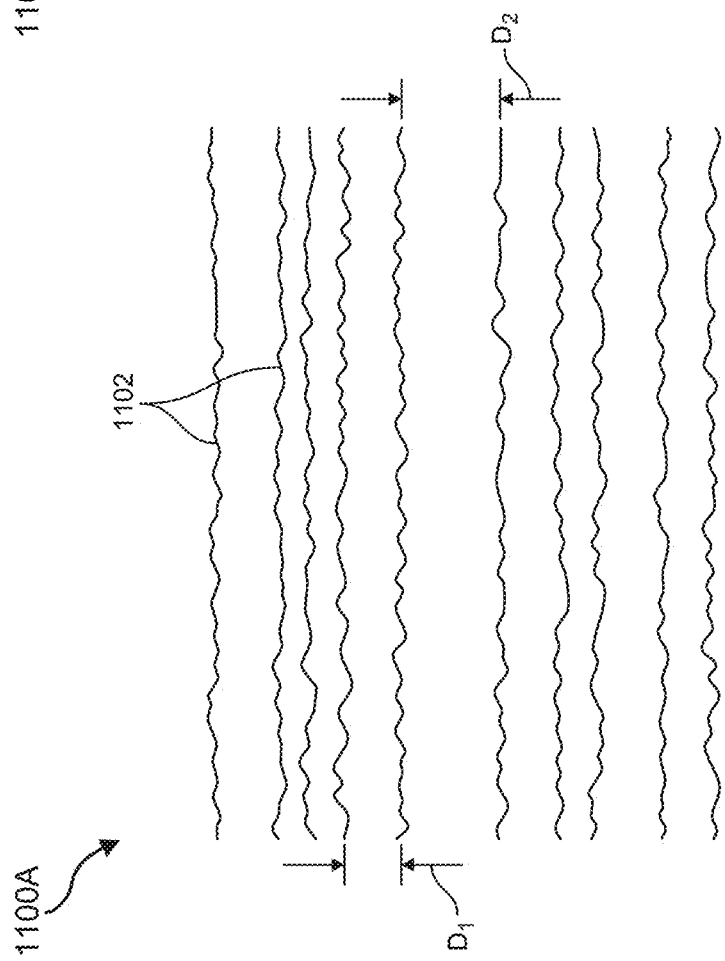

FIGS. 11A and 11B illustrate some example patterns 1100 of conductive traces with variable distances between adjacent conductive traces therein. For example, FIG. 11A illustrates a pattern 1100A of nonintersecting conductive traces 1102, similar to the pattern 700A of FIG. 7A. However, the distances between different sets of adjacent conductive traces 1102 may be variable. For example, two of the adjacent conductive traces 1102 may be separated by a first distance $D_1$, and two other adjacent conductive traces 1102 may be separated by a second, greater distance $D_2$. The variability of the distances may be random, pseudo-random, or predetermined within a range of distances suitable to achieve a desired application of voltage to a corresponding electroactive material. In some embodiments, the pattern 1100A of FIG. 11A may be somewhat less visible to the human eye than the pattern 700A of FIG. 7A, due to the variability of the distances between the adjacent conductive traces 1102 in the pattern 1100A of FIG. 11A. However, in some examples, the voltage application using the pattern 1100A may be somewhat less uniform than the pattern 700A of FIG. 7A.

FIG. 11B illustrates a pattern 1100B of conductive traces 1102 in a lattice structure, similar to the pattern 700C of FIG. 7C. However, distances between the adjacent conductive traces 1102 of the pattern 1100B may be variable, as described above with reference to FIG. 11A. In some embodiments, the pattern 1100B of FIG. 11B may be somewhat less visible to the human eye than the pattern 700C of FIG. 7C, due to the variability of the distances between the adjacent conductive traces 1102 in the pattern 1100B of FIG. 11B. However, in some examples, the voltage application using the pattern 1100B may be somewhat less uniform than the pattern 700C of FIG. 7C.

Accordingly, patterns of conductive traces having different distances between adjacent conductive traces thereof may be selected for different deformable lenses, depending on a balance of design parameters (e.g., electrical needs, low visibility needs, fabrication cost, etc.) for a given application.

FIGS. 12A-12F are partial cross-sectional views of transducer assemblies 1200 of deformable optical lenses, showing various example configurations of conductive traces 1204 that may be employed.

Figure 12A:
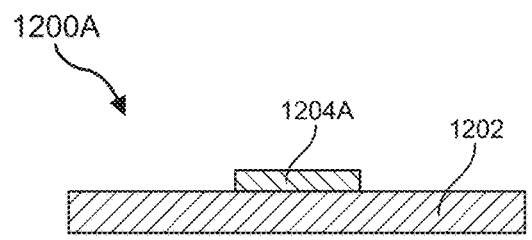
FIGS. 12A-12F are partial cross-sectional views of transducer assemblies of deformable optical lenses, showing various example configurations of conductive traces that may be employed, according to some embodiments of the present disclosure.

FIG. 12A shows a transducer assembly 1200A that includes an electroactive material 1202 (e.g., a transparent electroactive material 1202) and a conductive trace 1204A over a surface of the electroactive material 1202. The conductive trace 1204A may have a rectangular cross section. The conductive trace 1204A may be fabricated by printing (e.g., inkjet printing) or a photolithography process, for example.

Figure 12B:
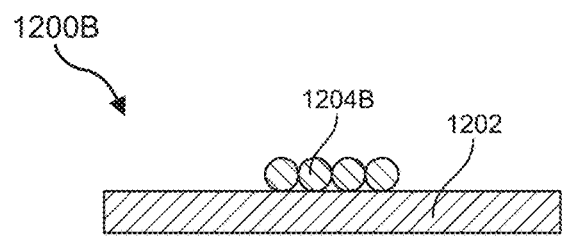

FIG. 12B shows a transducer assembly 1200B that includes an electroactive material 1202 (e.g., a transparent electroactive material 1202) and a conductive trace 1204B over a surface of the electroactive material 1202. The conductive trace 1204B may have a cross section defining multiple adjacent circles. The conductive trace 1204B may be fabricated by printing (e.g., inkjet printing, 3D printing) or otherwise laying wires, for example.

Figure 12C:
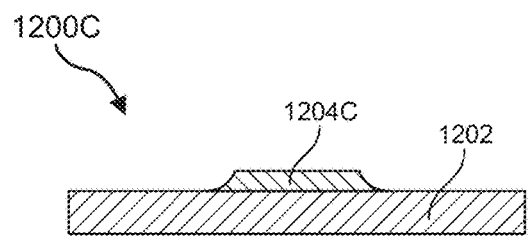

FIG. 12C shows a transducer assembly 1200C that includes an electroactive material 1202 (e.g., a transparent electroactive material 1202) and a conductive trace 1204C over a surface of the electroactive material 1202. The conductive trace 1204C may have a cross section forming a plateau with arcuate sides. By way of example and not limitation the conductive trace 1204C may be fabricated by printing (e.g., inkjet printing, 3D printing) or photolithography, which may optionally be followed by a heat-treating process.

Figure 12D:
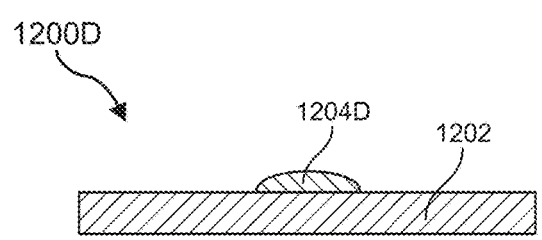

FIG. 12D shows a transducer assembly 1200D that includes an electroactive material 1202 (e.g., a transparent electroactive material 1202) and a conductive trace 1204D over a surface of the electroactive material 1202. The conductive trace 1204D may have a cross section in the shape of a truncated ellipse. By way of example and not limitation, the conductive trace 1204D may be fabricated by printing (e.g., inkjet printing, 3D printing) or photolithography, which may optionally be followed by a heat-treating process.

Figure 12E:
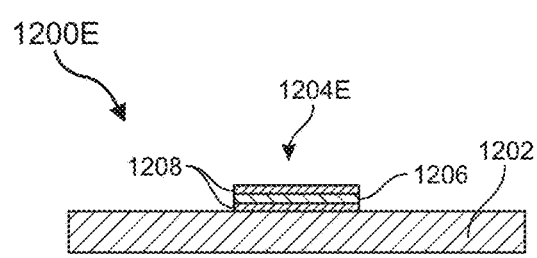

FIG. 12E shows a transducer assembly 1200E that includes an electroactive material 1202 (e.g., a transparent electroactive material 1202) and a conductive trace 1204E over a surface of the electroactive material 1202. The conductive trace 1204E may have a cross section in the shape of a rectangle like the conductive trace 1204A of FIG. 12A. However, the conductive trace 1204E may be formed by a metal material 1206 sandwiched between two conductive oxide materials 1208. Such an oxide-metal-oxide stack may be employed in another cross-sectional shape, such as any of the other example shapes shown and described with reference to FIGS. 12A-12D and 12F. By way of example and not limitation, the conductive trace 1204E may be fabricated by printing (e.g., inkjet printing, 3D printing), spin-coating, or otherwise depositing the alternate oxide materials 1208 and metal material 1206, which may be followed by a photolithography process to pattern the conductive trace 1208E. One or more heat-treating processes may also be employed, such as to improve a chemical bond between the conductive oxide material 1208 and the electroactive material 1202 and/or the metal material 1208.

Figure 12F:
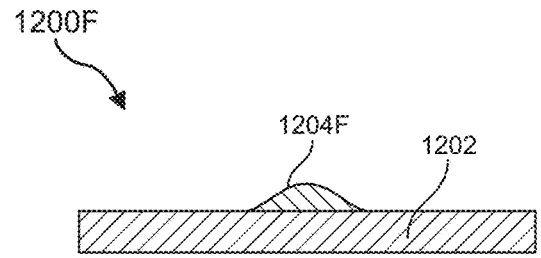

FIG. 12F shows a transducer assembly 1200F that includes an electroactive material 1202 (e.g., a transparent electroactive material 1202) and a conductive trace 1204F over a surface of the electroactive material 1202. The conductive trace 1204F may have a cross section in the shape of a bell curve, such as a quasi-gaussian shape. By way of example and not limitation, the conductive trace 1204D may be fabricated by printing (e.g., inkjet printing, 3D printing) or photolithography, which may optionally be followed by a heat-treating process.

Referring to FIGS. 12A-12F, the cross-sectional shape of the conductive traces 1204 may be selected to tailor the electrical and/or optical properties thereof. For example, some of the cross-sectional shapes may reduce a visibility of the conductive traces 1204. In addition, some of the cross-sectional shapes may focus light around the conductive traces 1204 due to light scattering or other edge effects. Also, some of the cross-sectional shapes may more uniformly distribute an electrical field across the underlying electroactive material 1202.

FIGS. 13A and 13B are schematic cross-sectional diagrams of transducer assemblies 1300 of deformable optical lenses, illustrating a calculated distribution of voltages through electroactive materials 1302 with different electrode configurations.

FIG. 13A illustrates a transducer assembly 1300A that includes nonlinear conductive traces 1304 (i.e., electrodes) disposed directly over a surface of an electroactive material 1302 (e.g., a transparent electroactive material, such as a transparent transducer of a deformable optical lens). As shown in FIG. 13A, areas of concentrated voltage may exist just under and adjacent to each of the conductive traces 1304. In an area between the conductive traces 1304, the voltage is not substantially uniformly distributed.

FIG. 13B illustrates a transducer assembly 1300B that includes nonlinear conductive traces 1304 (i.e., electrodes) disposed over a transparent voltage spreader material 1306, which may be disposed adjacent to the conductive traces and over the electroactive material 1302. The transparent voltage spreader material 1306 may exhibit a lower electrical conductivity and a higher optical transparency relative to the material of the conductive traces 1304. For example, the material of the conductive traces 1304 may exhibit at least a first electrical conductivity, and the transparent voltage spreader material 1306 may exhibit a second electrical conductivity that is lower than the first electrical conductivity. The material of the conductive traces 1304 may be substantially nontransparent (e.g., opaque), and the transparent voltage spreader material 1306 may exhibit at least some optical transparency. By way of example and not limitation, the transparent voltage spreader material 1306 may be or include a transparent conductive oxide (e.g., indium tin oxide ("ITO"), fluorine doped tin oxide ("FTO"), or doped zinc oxide), a transparent conductive polymer (e.g., polyacetylene, polyaniline, polypyrrole, polythiophene, etc.), and/or graphene.

As illustrated in FIG. 13B, a voltage applied by the conductive traces 1304 may be more uniformly distributed in the electroactive material 1302 when the transparent voltage spreader material 1306 is employed, compared to embodiments lacking the transparent voltage spreader material 1306 (see FIG. 13A).

FIGS. 14A and 14B are schematic diagrams of transparent transducers (e.g., of a deformable optical lens), illustrating calculated deformation profiles resulting from the different electrode configurations of FIGS. 13A and 13B, respectively. The calculations used to create the diagrams of FIGS. 14A and 14B were made using finite element analysis based on a PVDF film of 50 µm thickness with a 50 V/µm applied electric field.

FIG. 14A is a diagram 1400A of a transparent transducer including nonlinear, nonintersecting electrodes according to one embodiment. FIG. 14B is a diagram 1400B of a similar transparent transducer, but which includes a homogeneous electrode configuration. The nonuniform electric field resulting from the nonlinear, nonintersecting electrodes (FIG. 14A) may yield a displacement that is nonuniform and of smaller magnitude relative to the homogeneous electrode configuration (FIG. 14B). Accordingly, in some embodiments and for some configurations of electrodes, a voltage spreader material may improve control and amplitude of deformation of transparent electroactive materials.

FIGS. 15A-15C are partial cross-sectional views of transducer assemblies 1500, such as of deformable optical lenses. The transducer assemblies 1500 each include an electroactive material 1502, a conductive trace 1504 (e.g., electrode), and a voltage spreader material 1506.

FIG. 15A shows a transducer assembly 1500A that includes a voltage spreader material 1506A that is disposed between the electroactive material 1502 and the conductive trace 1504. FIG. 15B shows a transducer assembly 1500B that includes a voltage spreader material 1506B that is positioned over the electroactive material 1502 and adjacent to the conductive trace 1504, with the conductive trace 1504 positioned directly on a surface of the electroactive material 1502. FIG. 15C shows a transducer assembly 1500C that includes a voltage spreader material 1506C that is positioned over the electroactive material 1502 and over the conductive trace 1504, with the conductive trace 1504 positioned directly on a surface of the electroactive material 1502. In additional embodiments, a voltage spreader material may be positioned both under (FIG. 15A) and over (FIG. 15C) the conductive trace 1504.

FIGS. 16A and 16B are schematic diagrams 1600 of transparent transducers (e.g., of deformable optical lenses), illustrating calculated deformation profiles resulting from different electrode configurations. The calculations used to create the diagrams 1600 of FIGS. 16A and 16B were made using finite element analysis based on a PVDF film of 50 µm thickness with a 50 V/µm applied electric field.

FIG. 16A is a diagram 1600A of a transparent transducer including a patterned homogeneous circular electrode at a center of the transparent transducer. FIG. 16B is a diagram 1600B of a similar transparent transducer including a non-patterned homogeneous electrode. The transparent transducer having a patterned homogeneous circular electrode (FIG. 16A) may exhibit increased distortion relative to the transparent transducer having a non-patterned homogeneous transducer (FIG. 16B). In some applications, increased distortion may be desirable, such as to result in increased changes in an optical property in the transparent transducer upon application of a similar voltage.

Figure 17A:
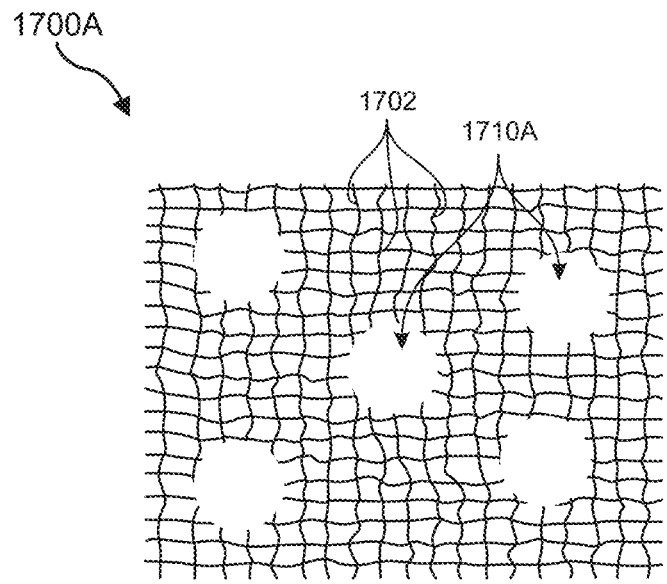
FIGS. 17A and 17B show two example patterns of conductive traces that may be employed to apply a voltage to an electroactive material (e.g., of a deformable optical lens), according to some embodiments of the present disclosure.
Figure 17B:
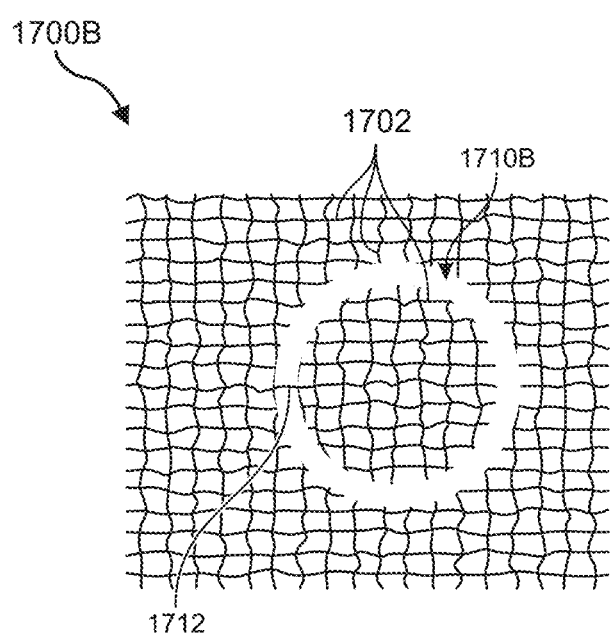

FIGS. 17A and 17B show two example patterns 1700 of conductive traces 1702 that may be employed to apply a voltage to a transparent electroactive material (e.g., an in-aperture transducer of a deformable optical lens).

FIG. 17A shows a pattern 1700A of conductive traces 1702 that includes multiple spaces 1710A free of conductive traces 1702. For example, the spaces 1710A may be circular, as shown in FIG. 17A. However, in additional embodiments, spaces lacking conductive traces 1702 may have other shapes and sizes.

FIG. 17B shows a pattern 1700B of conductive traces 1702 that includes a halo-shaped space 1710B free of conductive traces 1702. In other words, the outer region of the space 1710B may lack conductive traces 1702, while the interior of the space 1710B may include conductive traces 1702. The conductive traces 1702 in the interior of the space 1710B may be electrically connected to the conductive traces 1702 in the exterior of the space 1710B, such as by at least one conductive connector 1712.

Referring to FIGS. 17A and 17B, such patterns 1700 including spaces 1710 lacking conductive traces 1702 may, in some example implementations, yield increased deflection and/or more uniform deformation as compared to similar patterns without spaces that lack conductive traces.

FIGS. 18A-18D are partial cross-sectional views of transducer assemblies 1800 (e.g., of deformable optical lenses), illustrating various example electrode configurations. As discussed above with reference to FIG. 5, a transducer assembly may include an electroactive material with electrodes (e.g., conductive traces) on opposing surfaces thereof. FIGS. 18A-18D illustrate configurations of transducer assemblies 1800 that may include three or more layers of electrodes in and/or on an electroactive material 1802. The materials used in the layers of electrodes may be the same as each other or different from each other. In addition, one or more voltage spreader materials, as discussed above with reference to FIGS. 13A-15C, may be used in one or more of the layers of electrodes.

Figure 18A:
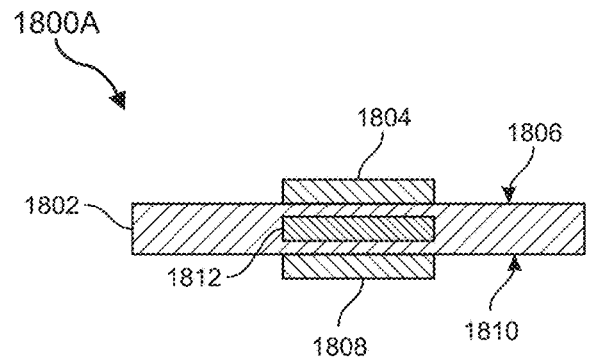
FIGS. 18A-18D are partial cross-sectional views of transducer assemblies (e.g., of deformable optical lenses), illustrating different example electrode configurations, according to some embodiments of the present disclosure.

FIG. 18A shows a transducer assembly 1800A that includes an electroactive material 1802, a first nonlinear conductive trace 1804 (e.g., electrode) disposed on a first surface 1806 of the electroactive material 1802, and a second nonlinear conductive trace 1808 (e.g., electrode) disposed on a second, opposite surface 1810 of the electroactive material 1802. The transducer assembly 1800A may also include a linear conductive trace 1812 (e.g., electrode) disposed within the electroactive material 1802 and between the first surface 1806 and the second surface 1810.

Figure 18B:
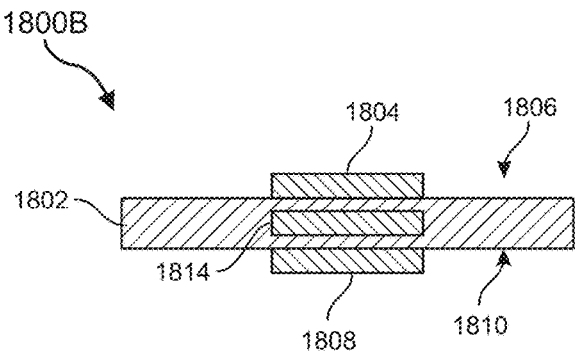

FIG. 18B shows a transducer assembly 1800B that includes an electroactive material 1802, a first nonlinear conductive trace 1804 (e.g., electrode) disposed on a first surface 1806 of the electroactive material 1802, and a second nonlinear conductive trace 1808 (e.g., electrode) disposed on a second, opposite surface 1810 of the electroactive material 1802. The transducer assembly 1800B may also include a third nonlinear conductive trace 1814 (e.g., electrode) disposed within the electroactive material 1802 and between the first surface 1806 and the second surface 1810.

Figure 18C:
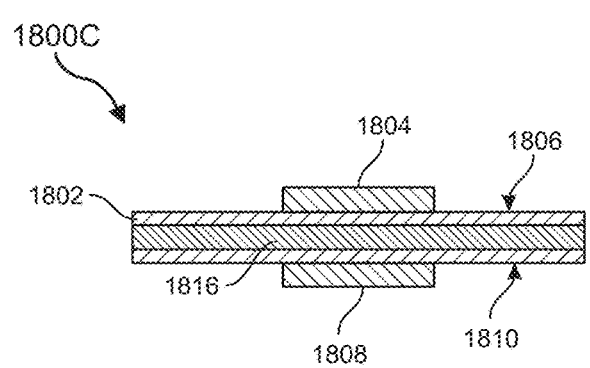

FIG. 18C shows a transducer assembly 1800C that includes an electroactive material 1802, a first nonlinear conductive trace 1804 (e.g., electrode) disposed on a first surface 1806 of the electroactive material 1802, and a second nonlinear conductive trace 1808 (e.g., electrode) disposed on a second, opposite surface 1810 of the electroactive material 1802. The transducer assembly 1800C may also include a homogeneous conductive film 1816 (e.g., electrode) disposed within the electroactive material 1802 and between the first surface 1806 and the second surface 1810.

Figure 18D:
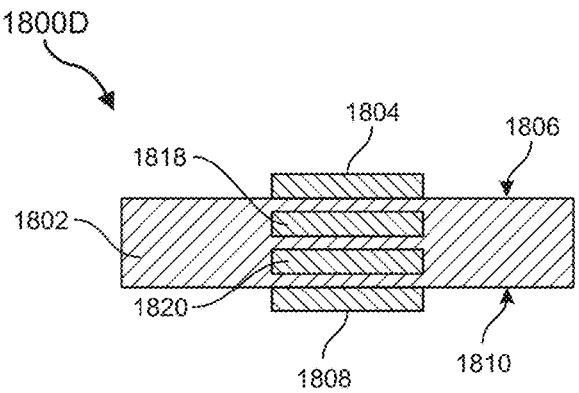

FIG. 18D shows a transducer assembly 1800D that includes an electroactive material 1802, a first nonlinear conductive trace 1804 (e.g., electrode) disposed on a first surface 1806 of the electroactive material 1802, and a second nonlinear conductive trace 1808 (e.g., electrode) disposed on a second, opposite surface 1810 of the electroactive material 1802. The transducer assembly 1800D may also include two additional conductive traces 1818, 1820 (e.g., electrodes) disposed at two respective levels within the electroactive material 1802 and between the first surface 1806 and the second surface 1810. Each of the two additional conductive traces 1818, 1820 may be nonlinear or linear.

Accordingly, FIGS. 18A-18D illustrate different example electrode configurations for multi-layer transducer assemblies 1800. Such multi-layer transducer assemblies 1800 may be useful for certain applications, such as to increase a maximum mechanical deformation or displacement, to increase the uniformity of an applied electric field, to increase the stiffness or flexibility of the transducer assemblies, to improve control over modes and shapes of deformation, etc.

Figure 19:
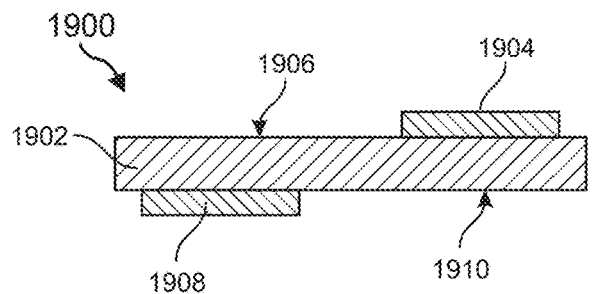
FIG. 19 is a partial cross-sectional view of a transducer assembly of a deformable optical lens, illustrating another configuration of conductive traces, according to at least one embodiment of the present disclosure.

FIG. 19 is a partial cross-sectional view of a transducer assembly 1900 (e.g., of a deformable optical lens), illustrating another configuration of a first nonlinear conductive trace 1904 on a first surface 1906 of an electroactive material 1902 and a second nonlinear conductive trace 1908 on a second, opposite surface 1910 of the electroactive material 1902. The transducer assembly 500 discussed above with reference to FIG. 5 showed the first conductive trace 504 and the second conductive trace 504 overlapping each other across the electroactive material 502. Referring to FIG. 19, first and second conductive traces 1904, 1908 may be offset (e.g., not overlapping) from each other. In some examples, the first conductive traces 1904 and second conductive traces 1908 may be positioned such that no overlap occurs. In additional examples, the first and second conductive traces 1904, 1908 may partially overlap each other (e.g., occasionally overlap each other and/or overlap each other across only a portion of a width thereof).

Figure 20B:
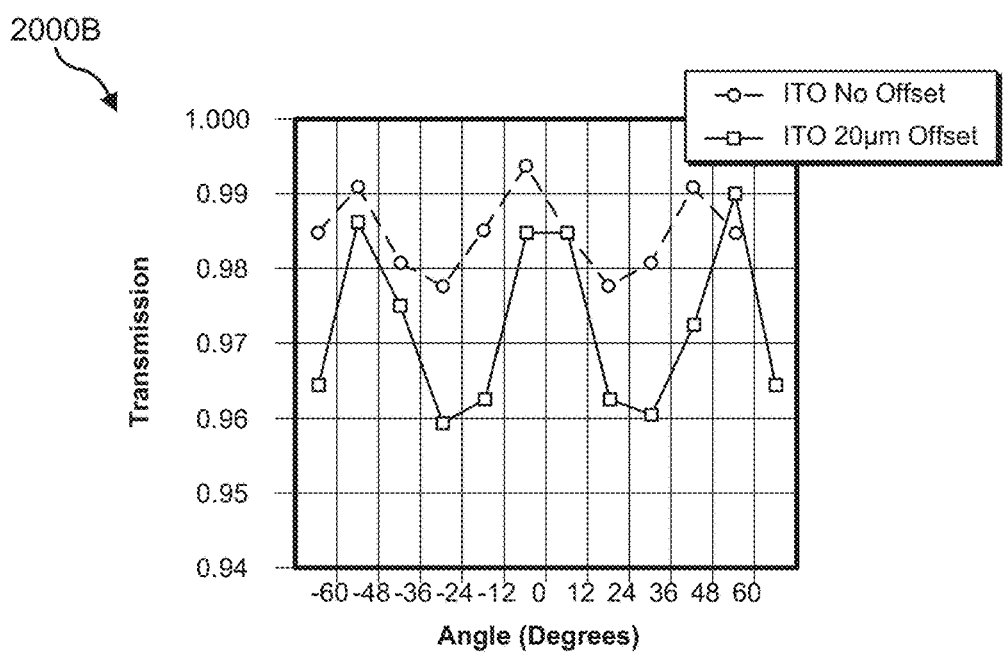

FIGS. 20A and 20B are plots 2000 showing optical transmission through transducer assemblies having different configurations of conductive traces. Values for the plots 2000 of FIGS. 20A and 20B were calculated using finite difference time domain ("FDTD") simulations for optical transmission using silver electrodes (FIG. 20A) and ITO electrodes (FIG. 20B) that are 100 nm thick, 10 µm wide, and spaced vertically (i.e., across an electroactive material) by 20 µm. Calculations were made for both offset electrodes (see FIG. 19) and non-offset electrodes (see FIG. 5) at various angles of light incidence. Transparency was calculated from about 3 cm away from the transducer assemblies. FIG. 21 is a partial cross-sectional view of a transducer assembly 2100 and an incident light source 2120 to illustrate how the incident angles of FIGS. 20A and 20B are defined. As shown in FIG. 21, the transducer assembly 2100 may include an electroactive material 2202 with a first electrode 2204 on a first surface 2106 and a second electrode 2208 on a second, opposite surface 2110. Light from the incident light source 2101 may be directed at or through the transducer assembly 2100 at an incident light angle θ relative to normal (e.g., relative to the first surface 2106). The incident light angle θ represents the angles identified in the plots 2000 of FIGS. 20A and 20B.

Referring again to FIGS. 20A and 20B, silver electrodes are opaque but generally have a higher conductivity than ITO electrodes. ITO electrodes are transparent but generally have lower conductivity than silver electrodes. The plot 2000A of FIG. 20A shows that opaque silver electrodes that fully overlap (i.e., with no offset) are generally more optically transmissive at low angles of incident light and at some high angles of incident light, while opaque silver electrodes that do not overlap (i.e., that are offset) are generally more optically transmissive at intermediate angles of incident light. The plot 2000B of FIG. 20B shows that transparent ITO electrodes that overlap (i.e., with no offset) are generally more optically transmissive at substantially all angles of incident light compared to ITO electrodes that do not overlap (i.e., that are offset). Accordingly, forming the electrodes to be offset or not offset may affect the optical transparency, depending on the material used for the electrodes.

FIGS. 22A-22C are partial cross-sectional views of transducer assemblies 2200 having different configurations and various example driving circuits 2230 for applying voltages to the respective transducer assemblies 2200. Using the driving circuits 2230 to apply voltages to the transducer assemblies 2200 as described and shown in FIGS. 22A-22C may facilitate bending or other deformation of the transducer assemblies 2200.

FIG. 22A shows a transducer assembly 2200A that includes an electroactive material 2202, a first electrode 2204, and an opposing second electrode 2208. A driving circuit 2230A may be used to apply a voltage between the first and second electrodes 2204, 2208, such as to apply an electric field to the electroactive material 2202. For example, a positive node of the driving circuit 2230B may be operably connected to the first electrodes 2204 and a negative node of the driving circuit 2230B may be operably connected to the second electrode 2208.

FIG. 22B shows a transducer assembly 2200B that includes the electroactive material 2202, the first and second electrodes 2204, 2208, and an intermediate electrode 2214 disposed within the electroactive material 2202. A driving circuit 2230B may be used to apply alternating voltages to the electrodes 2204, 2208, 2214. For example, a positive node of the driving circuit 2230B may be operably connected to the first and second electrodes 2204, 2208 and a negative node of the driving circuit 2230B may be operably connected to the intermediate electrode 2214.

FIG. 22C shows a transducer assembly 2200C that includes the electroactive material 2202, the first and second electrodes 2204, 2208, an upper intermediate electrode 2218 within the electroactive material 2202 near the first electrode 2204, and a lower intermediate electrode 2220 within the electroactive material 2202 near the second electrode 2208. A driving circuit 2230C may be used to apply alternating voltages to the electrodes 2204, 2208, 2218, 2220. For example, a positive node of the driving circuit 2230C may be operably connected to the first electrode 2204 and the lower intermediate electrode 2220 and a negative node of the driving circuit 2230C may be operably connected to the second electrode 2208 and the upper intermediate electrode 2218.

FIG. 23 is a flow diagram illustrating a method 2300 of fabricating a transparent electroactive system, such as a deformable optical lens or a transducer assembly of a deformable optical lens. In operation 2310, a first electrode material may be formed over a first surface of a deformable transparent electroactive material. The first electrode material may include nonlinear conductive traces.

Operation 2310 may be performed in a variety of ways. For example, the first electrode material may be formed from at least one metallic material, (such as gold, silver, titanium, copper, etc.), a conductive ceramic material, carbon nanotubes, nanowires, single- or multi-layer graphene, etc. Depending on the material used, the first electrode material may be deposited on the first surface of the deformable transparent electroactive material, such as by vapor phase deposition or liquid phase deposition. Some suitable vapor phase deposition techniques include sputtering, evaporation, and aerosol techniques. Example liquid phase deposition techniques include printing (e.g., spray coating, screen/gravure/inkjet printing), aerosol/spray coating, spin coating, dip coating, drop casting, doctor blading, surface functionalization self-assembly, templated self-assembly, etc.

After or before deposition, the nonlinear conductive traces may be patterned, such as by forming the first electrode material and selectively removing portions of the first electrode material to define the conductive traces. By way of example and not limitation, patterning of the first electrode material may be achieved by photopolymer liftoff/masking, soft lithography, shadowmasking, wet chemical etching, dry chemical etching, and/or physical plasma etching.

Implementations of nonlinear conductive traces including carbon nanotubes or metal nanowires may be formed by mechanical transfer, spin coating, dip coating, printing, aerosol/spray coating, drop casting, doctor blading, screen/gravure/inkjet printing, surface functionalization self-assembly, or templated self-assembly. The nanotubes or nanowires may be patterned before or after deposition, such as by one or more of the following example techniques: dry chemical etching, physical plasma etching, soft lithography, photopolymer liftoff, mechanical transfer, or wet chemical etching.

Implementations of nonlinear conductive traces including graphene may be formed by, for example, mechanical transfer, spin/dip coating, soft lithography, drop casting, printing, aerosol, doctor blading, self-assembly, templated self-assembly, or reduction of graphene oxide deposited by one of the techniques described above. Materials including graphene may be patterned before or after deposition by techniques including, but not limited to, dry chemical etching, physical plasma etching, reactive gas exposure, or soft lithography.

After the first electrode material is formed, before and/or after patterning, one or more additional processes may be performed to increase a conductivity and/or transparency of the first electrode material. For example, a conductivity of materials including metal nanowires and/or carbon nanotubes may be improved by heating, irradiation, chemical reaction, or combinations thereof. Such processes may also include modifying the crystallinity or doping of the first electrode material, such as by thermal annealing, irradiation, intercalation, adsorption, chemisorption, physisorption, chemical reaction, or combinations thereof. A composition or oxidation state of the first electrode material may be modified by driving chemical reactions, such as by reducing or oxidizing metal salts or sol-gels, or by burning off organic compounds (e.g., surfactants, binders, or polymers). In embodiments including graphene, the material may be oxidized or functionalized to decrease conductivity and increase transparency. In some examples, these structural and/or chemical modifications may be performed homogeneously across the patterned first electrode material or may be performed to create areas of modified material and areas of unmodified material.

In some embodiments, the first electrode material may also include a voltage spreader material, as discussed above. The voltage spreader material may be formed of the materials and by the techniques described above. The voltage spreader material may be formed of a single material or of a stack of two or more layers of materials. In some examples, forming the voltage spreader material to include a stack of two or more layers of materials may increase conductivity and/or transparency when compared to a single material. Additional processing may be performed after the entire voltage spreader material is formed, or after individual layers of the voltage spreader material are formed. As illustrated in FIGS. 15A-15C, the voltage spreader material may be formed before, at the same time as, or after the nonlinear conductive traces are formed.

Referring again to FIG. 23, in operation 2320, a second electrode material may be formed over a second, opposite surface of the transparent electroactive material. The first electrode material and the second electrode material may be positioned and configured to apply a sufficient voltage to the transparent electroactive material to deform the transparent electroactive material.

Operation 2320 may be performed in a variety of ways. For example, the second electrode material may be formed by any of the techniques described above with reference to forming the first electrode material. The second electrode material may be formed to include or not to include nonlinear conductive traces.

Accordingly, the present disclosure describes transparent electroactive systems and related methods that may exhibit improved optical and electrical properties compared to conventional systems and methods. For example, deformable optical lenses with electrodes including nonlinear conductive traces may be visibly transparent to a user, even though the nonlinear conductive traces may be positioned within an optical aperture thereof. Additionally, the electrodes may be capable of applying a sufficient voltage to corresponding electroactive materials to deform the deformable optical lenses to achieve a desired alteration of an optical property thereof.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A transparent electroactive system, comprising:
   at least one transparent electroactive material that is deformable upon application of a sufficient voltage to the transparent electroactive material;
   a first electrode material disposed over a first surface of the transparent electroactive material for applying the sufficient voltage to the transparent electroactive material; and
   a second electrode material disposed over a second, opposite surface of the transparent electroactive material for applying the sufficient voltage to the electroactive material,
   wherein the first electrode material comprises conductive traces that are nonlinear in a plane defined by the first surface when the first surface is in a planar state.

2. The transparent electroactive system of claim 1, further comprising:
   a transparent voltage spreader material positioned adjacent to the conductive traces, wherein the first electrode material exhibits at least a first electrical conductivity and the transparent voltage spreader material exhibits a second electrical conductivity lower than the first electrical conductivity.

3. The transparent electroactive system of claim 2, wherein the transparent voltage spreader material is positioned in at least one of the following locations:
   laterally adjacent to the conductive traces and over the first surface of the transparent electroactive material;
   between the conductive traces and the first surface of the transparent electroactive material; or
   over the conductive traces on an opposite side thereof from the first surface of the transparent electroactive material.

4. The transparent electroactive system of claim 1, wherein average distances between adjacent conductive traces vary in a random or pseudo-random manner.

5. The transparent electroactive system of claim 1, wherein the second electrode material comprises additional conductive traces that are nonlinear.

6. The transparent electroactive system of claim 5, wherein the conductive traces of the first electrode material do not overlap the additional conductive traces of the second electrode material.

7. The transparent electroactive system of claim 1, further comprising a third electrode material disposed within the transparent electroactive material between the first surface and the second surface.

8. The transparent electroactive system of claim 7, wherein the third electrode material comprises further conductive traces that are nonlinear.

9. The transparent electroactive system of claim 1, wherein each of the first and second electrode materials comprises a metallic material.

10. The transparent electroactive system of claim 1, wherein the conductive traces of the first electrode material are arranged in a lattice structure.

11. The transparent electroactive system of claim 10, wherein the lattice structure is patterned to include at least one space free of conductive traces.

12. The transparent electroactive system of claim 1, wherein each of the conductive traces of the first electrode material has at least one of the following cross-sectional shapes:
   substantially rectangular;
   substantially circular;
   multiple adjacent circles;
   truncated elliptical;
   plateau with arcuate sides; or
   bell-curve.

13. The transparent electroactive system of claim 1, wherein the first electrode material comprises a metallic material disposed between conductive oxide materials.

14. The transparent electroactive system of claim 1, wherein the conductive traces of the first electrode material are not visible to an unaided human eye positioned up to 3 cm away and from an angle of within 60 degrees from normal to the first surface.

15. The transparent electroactive system of claim 1, wherein each of the conductive traces has a lateral width that is less than about 100 µm, and average distances between adjacent conductive traces are each greater than about 250 µm.

16. A transparent electroactive system, comprising:
   at least one transparent electroactive material that is deformable upon application of a sufficient voltage thereto;
   a first electrode material disposed over a first surface of the transparent electroactive material, the first electrode material comprising conductive traces that are nonlinear in a plane defined by the first surface when the first surface is in a planar state;
   a second electrode material disposed over a second, opposite surface of the transparent electroactive material; and
   an electrical circuit operably coupled to the first and second electrode materials and configured to control application of the sufficient voltage to the transparent electroactive material to deform the transparent electroactive material.

17. The transparent electroactive system of claim 16, further comprising a deformable, transparent, electrically passive material disposed adjacent to the electroactive material.

18. A method of fabricating a transparent electroactive system, comprising:
   forming a first electrode material over a first surface of a transparent electroactive material that is deformable upon application of a sufficient voltage thereto, the first electrode material comprising conductive traces that are nonlinear in a plane defined by the first surface when the first surface is in a planar state; and
   forming a second electrode material over a second, opposite surface of the transparent electroactive material,
   wherein the first electrode material and the second electrode material are positioned and configured to apply the sufficient voltage to the transparent electroactive material to deform the transparent electroactive material.

19. The method of claim 18, wherein forming the first electrode material comprising conductive traces comprises:
   forming the first electrode material; and
   selectively removing portions of the first electrode material to define the conductive traces.

20. The method of claim 18, wherein each of forming the first electrode material and forming the second electrode material comprises forming at least one of the following materials:
   a metallic material;
   a conductive nanomaterial;
   a graphene material; or
   a conductive ceramic material.

* * * * *